(12) United States Patent
Lu

(10) Patent No.: US 11,443,742 B2
(45) Date of Patent: Sep. 13, 2022

(54) METHOD AND APPARATUS FOR DETERMINING A DIALOG STATE, DIALOG SYSTEM, COMPUTER DEVICE, AND STORAGE MEDIUM

(71) Applicant: TENCENT TECHNOLOGY (SHENZHEN) COMPANY LIMITED, Shenzhen (CN)

(72) Inventor: Xiaodong Lu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 150 days.

(21) Appl. No.: 16/921,300

(22) Filed: Jul. 6, 2020

(65) Prior Publication Data
US 2020/0335104 A1    Oct. 22, 2020

Related U.S. Application Data

(63) Continuation of application No. PCT/CN2019/084707, filed on Apr. 28, 2019.

(30) Foreign Application Priority Data

Jun. 7, 2018    (CN) .......................... 201810582030.6

(51) Int. Cl.
*G06F 40/35*    (2020.01)
*G10L 15/22*    (2006.01)
(Continued)

(52) U.S. Cl.
CPC .............. *G10L 15/22* (2013.01); *G06F 40/30* (2020.01); *G06N 3/04* (2013.01); *G10L 15/1815* (2013.01);
(Continued)

(58) Field of Classification Search
None
See application file for complete search history.

(56) References Cited

U.S. PATENT DOCUMENTS 6,778,970 B2 *  8/2004  Au .......................... G06F 40/30
                                                    706/54
9,741,336 B2 *  8/2017  Williams .............. G10L 15/063
(Continued)

FOREIGN PATENT DOCUMENTS

| CN | 107104812 A | 2/2018 |
| CN | 10608340 A | 6/2018 |
| CN | 108874967 A | 11/2018 |

OTHER PUBLICATIONS

PCT International Search Report with PCT Written Opinion of the National Intellectual Property Administration, PRC (ISA/CN) dated Jul. 26, 2019 in PCT/CN2019/084707—10 pages.
(Continued)

*Primary Examiner* — Richard Z Zhu
(74) *Attorney, Agent, or Firm* — ArentFox Schiff LLP

(57) ABSTRACT

In a method for determining a dialog state, first dialog information is obtained. The first dialog information is dialog information inputted during a dialog process. Based on the first dialog information, target scenario information corresponding to the first dialog information is determined. The target scenario information is used to indicate a dialog scenario of the first dialog information. Based on the first dialog information and the target scenario information, a first dialog state corresponding to the first dialog information is obtained. The first dialog state is used to represent a response mode for responding to the first dialog information.

18 Claims, 9 Drawing Sheets

(51) Int. Cl.
*G06N 3/04* (2006.01)
*G10L 15/18* (2013.01)
*G06F 40/30* (2020.01)
*G06F 40/205* (2020.01)

(52) U.S. Cl.
CPC ............ *G06F 40/205* (2020.01); *G06F 40/35* (2020.01); *G10L 15/1822* (2013.01); *G10L 2015/228* (2013.01)

(56) References Cited

U.S. PATENT DOCUMENTS

| | | | |
|---|---|---|---|
| 9,922,642 B2 * | 3/2018 | Pitschel | G10L 15/063 |
| 2002/0157116 A1 | 10/2002 | Jasinschi | |
| 2008/0201135 A1 * | 8/2008 | Yano | G10L 15/1822 |
| | | | 704/201 |
| 2014/0257794 A1 * | 9/2014 | Gandrabur | G10L 15/1822 |
| | | | 704/9 |
| 2015/0363393 A1 * | 12/2015 | Williams | G10L 15/22 |
| | | | 704/8 |
| 2016/0042735 A1 * | 2/2016 | Vibbert | G10L 15/222 |
| | | | 704/257 |
| 2016/0351206 A1 * | 12/2016 | Gelfenbeyn | G10L 15/26 |
| 2017/0011289 A1 * | 1/2017 | Gao | G06F 40/268 |
| 2018/0052842 A1 * | 2/2018 | Hewavitharana | G06F 16/3329 |
| 2018/0308487 A1 * | 10/2018 | Goel | G10L 15/1815 |
| 2019/0341021 A1 * | 11/2019 | Shang | G06N 3/0454 |

OTHER PUBLICATIONS

EP Communication dated Jun. 23, 2021 in EP Application No. 19814009.7.

* cited by examiner

METHOD AND APPARATUS FOR DETERMINING A DIALOG STATE, DIALOG SYSTEM, COMPUTER DEVICE, AND STORAGE MEDIUM

RELATED APPLICATION

This application is a continuation of International Application No. PCT/CN2019/084707, filed on Apr. 28, 2019, which claims priority to Chinese Patent Application No. 201810582030.6, entitled "METHOD AND APPARATUS FOR DETERMINING A DIALOG STATE, DIALOG SYSTEM, TERMINAL, AND STORAGE MEDIUM" filed on Jun. 7, 2018. The entire disclosures of the prior applications are hereby incorporated by reference in their entirety.

FIELD OF THE TECHNOLOGY

The present disclosure relates to the field of Internet technologies, and in particular, to determining a dialog state.

BACKGROUND OF THE DISCLOSURE

In a dialog with a robot, the robot may receive dialog information inputted by a user and make a response according to the dialog information. In the process, the robot may perform semantic understanding on the dialog information, determine a dialog state according to a semantic understanding, and make a response according to the dialog state. The dialog state is used for representing a response mode for responding to the dialog information.

For example, assuming that dialog information inputted by the user is "This song is so terrible", a corresponding semantic understanding is that the dialog information relates to the field of music and instructs to switch a song. In this case, it may be determined that a response needs to be made to a voice message by switching a song, and the response mode (that is, the dialog state) indicates a specific switching manner in which switching is performed. It can be determined, according to the semantic understanding of the dialog information, that song playing is to be switched to a next song in a current play list. In other words, a dialog state is determined to be "Switch song playing to a next song in a current play list". Correspondingly, the robot may perform, according to the dialog state, an operation of playing the next song.

In the related art, the dialog state may be determined by using a long short-term memory (LSTM) neural network. An implementation process includes inputting a semantic understanding corresponding to inputted dialog information into the LSTM neural network, and determining, by the LSTM neural network based on the semantic understanding and a dialog state corresponding to dialog information inputted before the dialog information, a dialog state corresponding to the inputted dialog information.

However, factors such as a limited ability of the robot to understand dialog information inputted by the user (that is, a limited semantic understanding ability) or a less clear expression of dialog information made by the user, there is a deviation between a semantic understanding inputted into the LSTM neural network and a meaning that the user intends to express. Consequently, accuracy of a dialog state determined by the LSTM neural network according to the semantic understanding is relatively low.

SUMMARY

In exemplary aspects, in a method for determining a dialog state, first dialog information is obtained. The first dialog information being dialog information inputted during a dialog process. Based on the first dialog information, target scenario information corresponding to the first dialog information is determined. The target scenario information is used to indicate a dialog scenario of the first dialog information. Based on the first dialog information and the target scenario information, a first dialog state corresponding to the first dialog information is obtained. The first dialog state is used to represent a response mode for responding to the first dialog information.

In exemplary aspects, scenario information is represented by a scenario vector, and each scenario vector is used to represent an association relationship between corresponding scenario information and other scenario information. Based on a scenario vector of the target scenario information, at least one piece of candidate scenario information having an association relationship with the target scenario information is determined. Based on the target scenario information and the at least one piece of candidate scenario information, the first dialog state according to the first dialog information is determined.

In exemplary aspects, before the determining the at least one piece of candidate scenario information, semantic tags of a plurality of pieces of scenario information are obtained. The semantic tag is used for identifying a type of a dialog scenario indicated by scenario information. At least one scenario network is built based on the semantic tags of the plurality of pieces of scenario information. Each semantic tag is a network node in the at least one scenario network. A plurality of scenario vectors are constructed according to the at least one scenario network. The plurality of scenario vectors corresponds one-to-one to the plurality of pieces of scenario information.

In exemplary aspects, in the constructing of the plurality of scenario vectors, the plurality of scenario vectors are constructed according to a connection relationship between network nodes in the at least one scenario network.

In an exemplary aspect, in the constructing of the plurality of scenario vectors, any path in the at least one scenario network is walked to obtain a plurality of node sequences. Each node sequence comprising at least two network nodes. A similarity between each network node and another network node is determined based on the plurality of node sequences. The plurality of scenario vectors is constructed based on the similarity.

In an exemplary aspect, in the determining of the target scenario information, a semantic understanding of the first dialog information is obtained based on the first dialog information. A semantic tag of the first dialog information is determined based on the semantic understanding. Scenario information set is determined based on the semantic tag, to determine the target scenario information. The scenario information set records a plurality of pieces of scenario information.

In exemplary aspects, the semantic tag of the first dialog information is a tag set comprising a plurality of semantic tags, the scenario information is represented by the scenario vector, and in the querying of the scenario information set based on the semantic tag, to determine the target scenario information, the scenario information set is queried separately based on the plurality of semantic tags, to obtain at least one scenario vector corresponding to the plurality of semantic tags. In a case that there are a plurality of scenario vectors found through querying, the plurality of scenario vectors are spliced to obtain a target scenario vector.

In exemplary aspects, in the determining the target scenario information, the scenario information set is queried based on a semantic tag of the first dialog information, and first scenario information of the first dialog information is determined. Second scenario information corresponding to second dialog information inputted before the first dialog information is determined. The target scenario information is obtained based on the second scenario information and the first scenario information.

In exemplary aspects, in the obtaining of the target scenario information, the first scenario information is adjusted based on the second scenario information, to obtain the target scenario information.

In exemplary aspects, in the obtaining of the first dialog state corresponding to the first dialog information, a semantic understanding of second dialog information inputted before the first dialog information is obtained. The first dialog state is obtained based on the semantic understanding of the second dialog information, a semantic understanding of the first dialog information, and the target scenario information.

In exemplary aspects, in the obtaining of the first dialog state based on the semantic understanding of the second dialog information, a semantic understanding of the first dialog information, and the target scenario information, the semantic understanding of the first dialog information and the target scenario information are inputted into a neural network. The first dialog state is determined according to a second dialog state, the semantic understanding of the first dialog information, and the target scenario information. The second dialog state is determined according to the semantic understanding of the second dialog information.

In exemplary aspects, a computer device includes circuitry that obtains first dialog information. The first dialog information is dialog information inputted during a dialog process. The circuitry determines, based on the first dialog information, target scenario information corresponding to the first dialog information. The target scenario information is used to indicate a dialog scenario of the first dialog information. The circuitry obtains, based on the first dialog information and the target scenario information, a first dialog state corresponding to the first dialog information. The first dialog state is used to represent a response mode for responding to the first dialog information.

In exemplary aspects, scenario information is represented by a scenario vector. Each scenario vector is used for representing an association relationship between corresponding scenario information and other scenario information. To obtain the first dialog state the circuitry determines, based on a scenario vector of the target scenario information, at least one piece of candidate scenario information having an association relationship with the target scenario information. The circuitry determines, based on the target scenario information and the at least one piece of candidate scenario information, the first dialog state according to the first dialog information.

In exemplary aspects, before the at least one piece of candidate scenario information is determined, the circuitry obtains semantic tags of a plurality of pieces of scenario information. The semantic tag is used for identifying a type of a dialog scenario indicated by scenario information. The circuitry builds at least one scenario network based on the semantic tags of the plurality of pieces of scenario information. Each semantic tag being a network node in the at least one scenario network. The circuitry constructs a plurality of scenario vectors according to the at least one scenario network, the plurality of scenario vectors corresponding one-to-one to the plurality of pieces of scenario information.

In exemplary aspects, in constructing a plurality of scenario vectors according to the at least one scenario network, the circuitry constructs the plurality of scenario vectors according to a connection relationship between network nodes in the at least one scenario network.

In exemplary aspects, in constructing the plurality of scenario vectors the circuitry walks along any path in the at least one scenario network to obtain a plurality of node sequences. Each node sequence comprising at least two network nodes. The circuitry determines a similarity between each network node and another network node based on the plurality of node sequences. The circuitry constructs the plurality of scenario vectors based on the similarity.

In exemplary aspects, in determining the target scenario information, the circuitry obtains a semantic understanding of the first dialog information based on the first dialog information, and recognizes a semantic tag of the first dialog information based on the semantic understanding. The circuitry queries a scenario information set based on the semantic tag, to determine the target scenario information. The scenario information set recording a plurality of pieces of scenario information.

In exemplary aspects, the semantic tag of the first dialog information is a tag set comprising a plurality of semantic tags. The scenario information is represented by the scenario vector. In querying a scenario information set based on the semantic tag, the circuitry queries the scenario information set separately based on the plurality of semantic tags, to obtain at least one scenario vector corresponding to the plurality of semantic tags. The circuitry splices, in a case that there is a plurality of scenario vectors found through querying, the plurality of scenario vectors, to obtain a target scenario vector.

In exemplary aspects, in determining the target scenario information corresponding to the first dialog information, the circuitry queries a scenario information set based on a semantic tag of the first dialog information, to determine first scenario information of the first dialog information. The circuitry obtains second scenario information corresponding to second dialog information inputted before the first dialog information, and obtains the target scenario information based on the second scenario information and the first scenario information.

In exemplary aspects, a non-transitory computer-readable medium is encoded with computer-readable instructions that, when executed by processing circuitry, cause the processing circuitry to perform a method in which first dialog information is obtained. The first dialog information is dialog information inputted during a dialog process. Based on the first dialog information, target scenario information corresponding to the first dialog information is determined. The target scenario information is used for indicating a dialog scenario of the first dialog information. Based on the first dialog information and the target scenario information, a first dialog state corresponding to the first dialog information is obtained. The first dialog state is used for representing a response mode for responding to the first dialog information.

BRIEF DESCRIPTION OF THE DRAWINGS

To describe the technical solutions of the exemplary embodiments of the present disclosure more clearly, the following drawings are provided and briefly described in this section. However, the accompanying drawings and the corresponding descriptions made herein correspond only to exemplary embodiments, and other embodiments are possible without departing from the scope of the present disclosure.

DETAILED DESCRIPTION

The following describes the exemplary embodiments of the present disclosure with reference to the accompanying drawings. As can be appreciated, the exemplary embodiments are not the sole embodiments of the features described herein, and other embodiments are possible without departing from the present disclosure.

During a dialog between a robot and a user, a process in which the robot receives dialog information inputted by the user and makes a response according to the dialog information is generally implemented through a spoken dialog system. The spoken dialog system is an intelligent man-machine interaction system that intends to understand spoken language of the user and make an effective response.

Figure 1A:
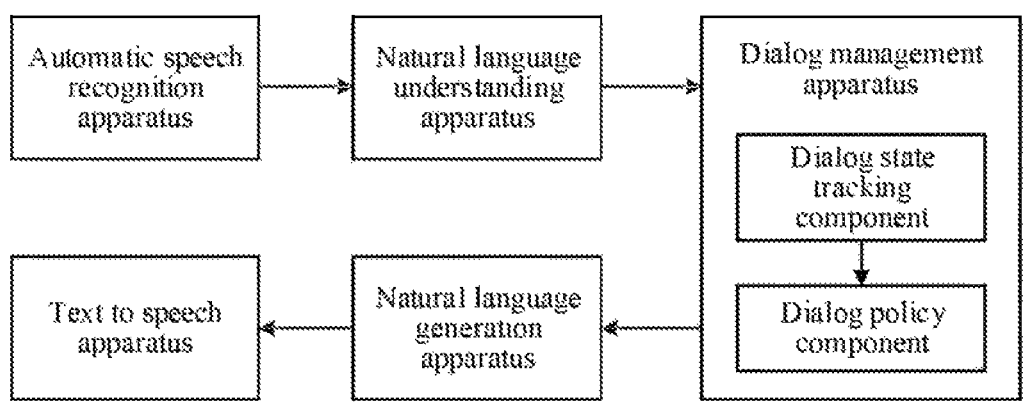
FIG. 1A is a schematic structural diagram of a spoken dialog system according to an exemplary embodiment of the present disclosure.

Referring to FIG. 1A, a spoken dialog system mainly includes an automatic speech recognition (ASR) apparatus, a natural language understanding (NLU) apparatus, a dialog management (DM) apparatus, a natural language generation (NLG) apparatus, a text to speech (TTS) apparatus, and the like. As can be appreciated, the apparatuses that form part of the spoken dialog system include circuitry that is configured to perform the functions described herein. The ASR apparatus is configured to recognize dialog information inputted by a user, and input the recognized dialog information into the NLU apparatus. The NLU apparatus is configured to perform semantic understanding on the dialog information, and input a semantic understanding into the DM apparatus. The DM apparatus is configured to determine a dialog state according to the semantic understanding, and input the dialog state into the NLG apparatus. The dialog state is used for representing a response mode for responding to the dialog information. The NLG apparatus is configured to generate content of a response according to the dialog state, for example, generate natural language in a text form, or generate an operation execution instruction according to the dialog state. The TTS apparatus is configured to obtain the natural language in the text form generated by the NLG apparatus, convert the natural language in the text form into a fluent speech through a text to speech technology, and play the speech to the user, to implement a response to the dialog information of the user.

Still referring to FIG. 1A, the DM apparatus generally includes a dialog state tracking component and a dialog policy component. The dialog state tracking component is configured to determine a dialog state of the dialog information according to a semantic understanding of inputted dialog information and a semantic understanding of dialog information inputted before the dialog information. For example, if inputted dialog information is "This song is so terrible" and a semantic understanding of dialog information inputted before the dialog information relates to the field of music and instructs to play a song, it may be determined that a dialog state is "Switch song playing to a next song in a current play list." That is, it is determined that a response mode for responding to the dialog information is making a response through switching song playing to a next song in a current play list. The dialog policy component is configured to determine a to-be-performed action according to the dialog state determined by the dialog state tracking component and a preset task, to determine a policy of making a response to the dialog information. For example, a policy determined according to the dialog state, "Switch song playing to a next song in a current play list" may include determining whether to continue to ask a user for a preference for a song to determine how to perform an operation of switching song playing to a next song in a current play list, or determining, according to the dialog state, that an operation of switching song playing to a next song in a current play list needs to be performed.

Generally, functions of the spoken dialog system may be implemented through a computer-readable instruction stored in a non-transitory computer-readable medium and run on one or more terminals, and a function of each apparatus included in the spoken dialog system may also be implemented through the computer-readable instruction stored in the non-transitory computer-readable medium and run on the one or more terminals.

In the related art, a function of the dialog state tracking component is generally implemented through a neural network, and the neural network may be an LSTM neural network. An implementation process includes inputting a semantic understanding corresponding to inputted dialog information into the LSTM neural network, and determining, by the LSTM neural network based on the semantic understanding and a dialog state corresponding to dialog information inputted before the dialog information, a dialog state corresponding to the inputted dialog information. However, due to impact of factors such as a semantic ability of the NLU apparatus, an expression of a user, and a scenario of dialog information, accuracy of the dialog state determined by the LSTM neural network is relatively low.

Therefore, the exemplary embodiments of the present disclosure provide a method for determining a dialog state. Based on inputted dialog information, target scenario information corresponding to the dialog information is determined, where the target scenario information can reflect a dialog scenario generating the dialog information. A dialog state corresponding to the dialog information in the dialog scenario is determined based on the dialog information and the target scenario information. Interference from a plurality of different understandings of the same dialog information in different dialog scenarios to determining of the dialog state can be reduced, thereby effectively improving accuracy of determining the dialog state.

Figure 1B:
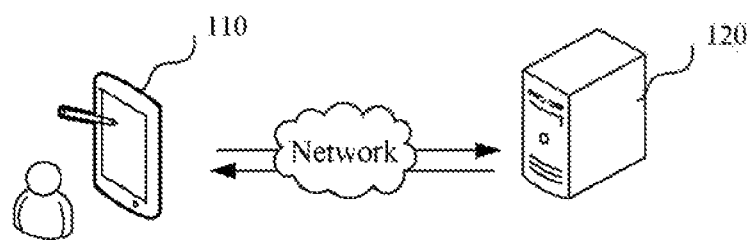
FIG. 1B is a diagram of an application environment of a method for determining a dialog state according to an exemplary embodiment of the present disclosure.

FIG. 1B is a diagram of an application environment of a method for determining a dialog state in an exemplary embodiment. Referring to FIG. 1B, the method for determining a dialog state is applied to a system for determining a dialog state. The system for determining a dialog state includes a terminal 110 and a server 120. The terminal 110 is connected to the server 120 through a network. The terminal 110 may be specifically a desktop terminal or a mobile terminal, and the mobile terminal may be specifically at least one of a mobile phone, a tablet computer, a notebook computer, and the like. The server 120 may be implemented by using an independent server or a server cluster including a plurality of servers.

Specifically, the terminal 110 obtains first dialog information, the first dialog information being dialog information inputted during a dialog process, and may send the first dialog information to the server 120. The server 120 obtains the first dialog information, determines, based on the first dialog information, target scenario information corresponding to the first dialog information, the target scenario information being used for indicating a dialog scenario of the first dialog information, and obtains, based on the first dialog information and the target scenario information, a first dialog state corresponding to the first dialog information, the first dialog state being used for representing a response mode for responding to the first dialog information. Further, the server 120 may notify the terminal 110 of the response mode corresponding to the first dialog information.

Figure 2:
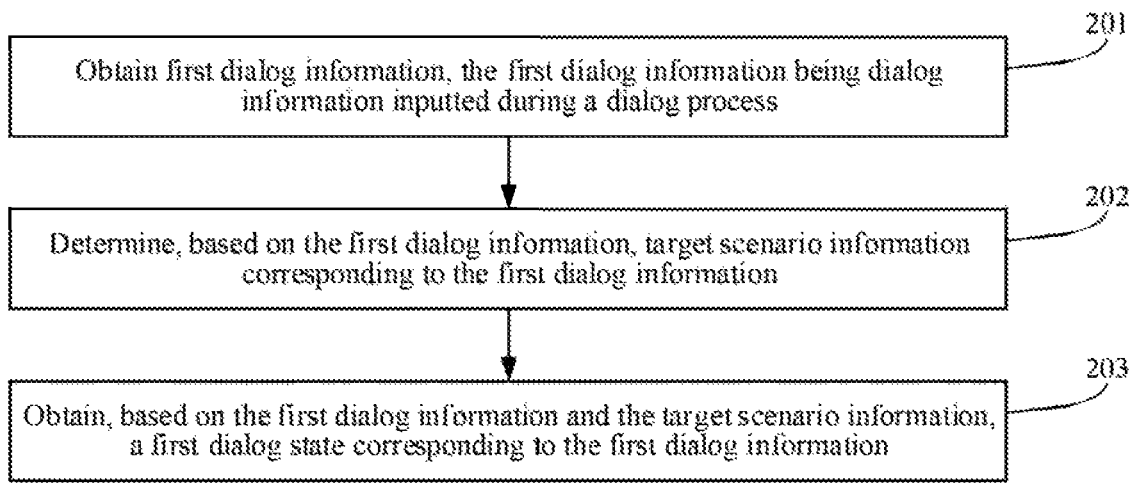
FIG. 2 is a flowchart of a method for determining a dialog state according to an exemplary embodiment of the present disclosure.

FIG. 2 shows a flowchart of a method for determining a dialog state according to an exemplary embodiment. The method may be applied to the foregoing spoken dialog system or dialog state tracking component. This exemplary embodiment describes the method by using the method applied to the dialog state tracking component as an example. As shown in FIG. 2, the method may include the following steps.

In step 201, first dialog information is obtained. The first dialog information is dialog information inputted during a dialog process. Generally, the first dialog information may be dialog information inputted by a user into a robot through voice input during a dialog process between the user and the robot. For example, first dialog information inputted by the user may be "This song is so terrible".

The dialog state tracking component generally determines a dialog state according to a semantic understanding recognized by the NLU apparatus. Therefore, when the method for determining a dialog state is applied to the dialog state tracking component, in step 201, the obtained first dialog information may be understood as a semantic understanding determined according to first dialog information inputted by a user. For example, assuming that dialog information inputted by the user is "This song is so terrible", the first dialog information may be a semantic understanding, "Dialog information relates to the field of music and instructs to switch a song", determined according to the dialog information.

The semantic understanding may be content obtained after the first dialog information is processed by using a natural language understanding (NLU) technology. In the NLU technology, processing, such as word segmentation, part-of-speech tagging, named entity recognition, text classification, and sentiment analysis, is performed on first dialog information inputted by a user, to obtain a corresponding semantic understanding. The word segmentation refers to segmenting a Chinese character sequence of first dialog information into word sequences. The part-of-speech tagging refers to tagging part-of-speech of a word in first dialog information, to determine a function of the word in a context of a dialog. The named entity recognition refers to a process of recognizing entities, such as names, place names, organization names, numbers, and dates, in first dialog information. The text classification refers to classifying dialog information into one or more of predefined categories, and the predefined category is defined in advance according to actual requirements. The sentiment analysis refers to determining a bipolar view (for example, being positive or negative), an emotion (for example, being pleased, sad, fond, or disgusted), and the like of a user on a topic involved in dialog information.

In step 202, based on the first dialog information, target scenario information corresponding to the first dialog information is determined. The target scenario information is used for indicating a dialog scenario built according to the first dialog information. For example, when a user inputs first dialog information of "I am watching XXX TV drama recently" the first dialog information may build a scenario concerning a TV drama, and the target scenario information may be used for indicating the scenario concerning the TV drama.

In an exemplary embodiment, there may be a plurality of possible implementations in step 202, and in this exemplary embodiment of this application, the possible implementations are described by using the following two possible implementations as examples.

Figure 3:
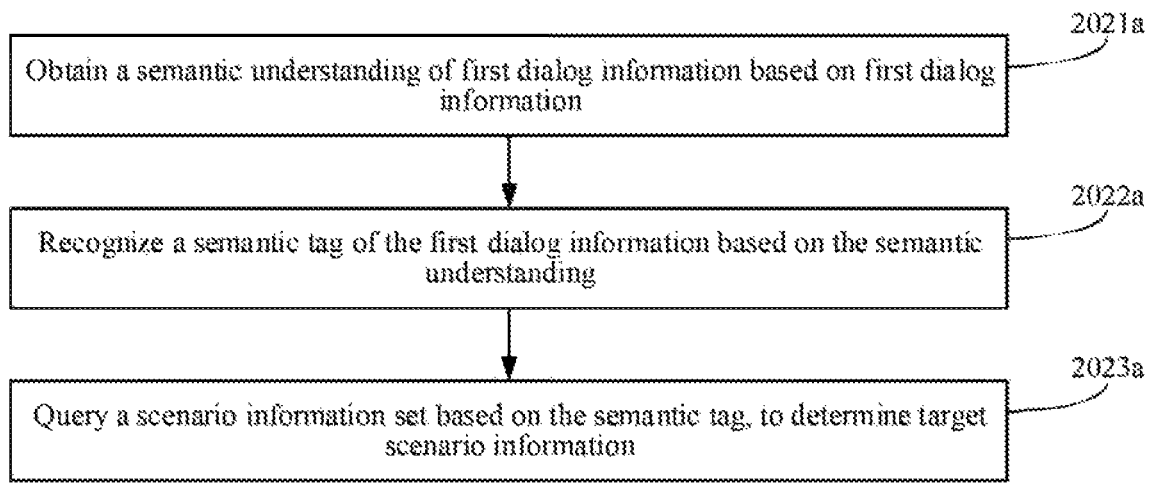
FIG. 3 is a flowchart of a method for determining target scenario information according to an exemplary embodiment of the present disclosure.

In a first possible implementation of determining target scenario information corresponding to the first dialog information, preset scenario information set may be queried according to the first dialog information to determine the target scenario information. As shown in FIG. 3, the implementation process of the first possible implementation of determining target scenario information may include the following steps.

In step 2021*a*, a semantic understanding of first dialog information is obtained based on the first dialog information. If the first dialog information in step 201 is dialog information inputted into a robot through voice input during a dialog process between a user and the robot, in step 2021*a*, a semantic understanding of the first dialog information may be obtained by using a natural language understanding technology. If the first dialog information in step 201 is a semantic understanding determined according to dialog information inputted by a user, there is no need to perform step 2021*a*, that is, step 2022*a*, described below, may be directly performed according to the semantic understanding of the first dialog information in step 201.

In step 2022*a*, a semantic tag of the first dialog information is recognized based on the semantic understanding. The semantic tag is used for identifying a type of a dialog scenario indicated by scenario information. A semantic tag of dialog information may be a tag, that is, the semantic tag may be a key word summarizing main content of a semantic understanding. Types of the semantic tag may include a title tag, a description tag, a keyword tag, and the like.

In an exemplary embodiment, there may be a plurality of implementations of recognizing a semantic tag of the first dialog information, and in this embodiment of this application, the implementations are described by using the following three possible implementations as examples.

In a first possible implementation of recognizing a semantic tag of the first dialog information, the semantic tag of the first dialog information may be recognized by using a classifier. A semantic understanding of first dialog information or a feature obtained according to a semantic understanding may be inputted into the classifier, after analyzing the inputted information, the classifier may determine one of a plurality of preset tags as a semantic tag corresponding to the inputted information, to obtain the semantic tag of the first dialog information. The classifier may be a naive Bayes classifier, a neural network classifier, a support vector machine classifier, or the like. The plurality of preset tags may be tags determined by the classifier during training. For example, assuming that preset tags in the classifier are "TV drama", "Music", and "Learning", a semantic understanding of first dialog information of "I am watching XXX TV drama recently" is inputted into the classifier, and after analyzing the semantic understanding, the classifier may determine the tag "TV drama" as a semantic tag of the first dialog information.

In a second possible implementation of recognizing a semantic tag of the first dialog information, the semantic tag of the first dialog information may be recognized by using a recommendation system. The recommendation system may obtain historical dialog information inputted by a user, analyze a user characteristic according to the historical dialog information, and establish a correspondence between the user characteristic and a semantic tag. When recognizing the semantic tag of the first dialog information, the recommendation system may determine a user characteristic according to a semantic understanding of inputted first dialog information, and determine the semantic tag of the first dialog information according to the correspondence between the user characteristic and a semantic tag. The recommendation system may be a content-based recommendation system, a collaborative filtering-based recommendation system, or the like.

In a third possible implementation of recognizing a semantic tag of the first dialog information, the semantic tag of the first dialog information may be recognized according to a preset rule set. In an exemplary embodiment, the rule set may be indicated as if a semantic understanding includes a word A1, a semantic tag of first dialog information is B1, and if a semantic understanding includes a word A2, a semantic tag of first dialog information is B2. For example, if a semantic understanding includes "Quarrel", a semantic tag of first dialog information may be "Angry", and if a semantic understanding includes "Dance", a semantic tag of first dialog information may be "Happy". An example of the rule set is merely used for description, and an actual rule set is relatively complex.

The first dialog information may correspond to a plurality of semantic tags, and the plurality of semantic tags may be key words summarizing main content of a semantic understanding from different perspectives. For example, the plurality of perspectives may include a semantic body, an emotion, a user group, a service environment, a physical environment, and the like. The following exemplarily describes each of the perspectives.

The semantic body may include a topic of a dialog, a field of a dialog, an intention of a dialog, an entity concept of a dialog, and the like. The topic of the dialog may include a favorite TV drama, a favorite song, or the like. The field of the dialog may include entertainment, communications, or the like. The intention of the dialog may include querying for or playing a song, or the like. The entity concept of the dialog may include a desk, a chair, and the like.

The emotion may include being positive, negative, impatient, angry, furious, happy, cheerful, joyful, and the like. The user group may include children, old people, females, males, young artists, and the like. The service environment may include that it is found through querying that there is traffic jam ahead or it is clear ahead, that it is found through querying that the schedule is delayed, that it is found through querying that the weather is good today, that it is found through querying that the weather is bad today, that it is found through querying that a service is enabled, and the like.

The physical environment may be a physical environment in which a robot is located or a physical environment in which a user is located. The physical environment may include an environment in which multiple users are chatting, an environment in which user is dancing, an environment in which a child is using a mobile phone, an environment in which a user is taking a nap, a dark environment, a noisy environment, and the like. For example, assuming that first dialog information is "This song is so terrible", a semantic understanding of the first dialog information is "Dialog information relates to the field of music and instructs to switch a song". After the semantic understanding is inputted into a classifier, obtained semantic tags may be "Happy" and "In a service environment of playing a song".

In step 2023*a*, scenario information set is queried based on the semantic tag to determine target scenario information. The scenario information set records correspondences between a plurality of pieces of scenario information and semantic tags. The scenario information set is queried according to a semantic tag, and target scenario information corresponding to the semantic tag may be obtained.

In an exemplary embodiment, each piece of scenario information may be represented by a scenario vector, each scenario vector is used for representing an association relationship between corresponding scenario information and other scenario information, and scenario information and a scenario vector representing the scenario information are in a one-to-one correspondence. In addition, a semantic tag of first dialog information may be a tag set including at least one semantic tag.

Figure 4:
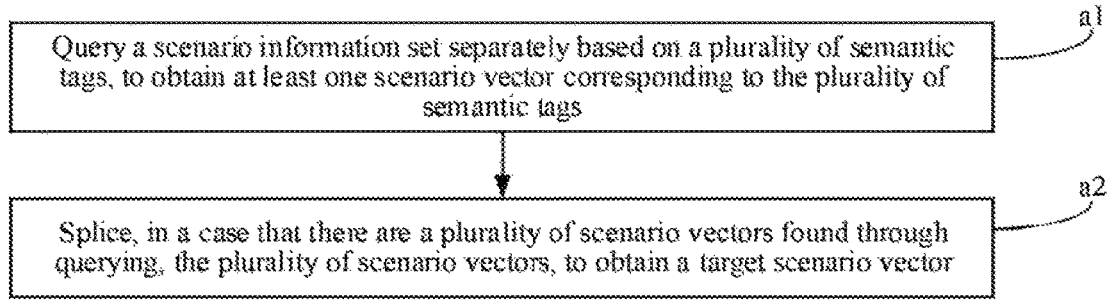
FIG. 4 is a flowchart of a method for querying a scenario information set based on a semantic tag to determine target scenario information according to an exemplary embodiment of the present disclosure.

When the scenario information is represented by the scenario vector, and the semantic tag of the first dialog information is a tag set including a plurality of semantic tags, referring to FIG. 4, an implementation process of step 2023a may include the following steps.

In step a1, scenario information set is queried separately based on the plurality of semantic tags to obtain at least one scenario vector corresponding to the plurality of semantic tags. Because scenario information and semantic tags may be in a one-to-many correspondence, and the scenario information and a scenario vector representing the scenario information are in a one-to-one correspondence, there may be one or more scenario vectors found through querying according to a plurality of semantic tags. If one scenario vector is found through querying according to the plurality of semantic tags, the scenario vector is target scenario information. If a plurality of scenario vectors are found through querying according to the plurality of semantic tags, the plurality of scenario vectors found through querying may be processed to obtain a target scenario vector, that is, step a2 is performed.

In step a2, in a case that there am a plurality of scenario vectors found through querying, the plurality of scenario vectors is specified to obtain a target scenario vector. The plurality of scenario vectors are spliced, that is, a vector splicing operation is performed on the plurality of scenario vectors.

For example, assuming that queried vectors are:

$$A1 = \begin{bmatrix} 1 \\ 2 \\ 3 \end{bmatrix}$$

and $$A2 = \begin{bmatrix} 1 \\ 1 \\ 1 \end{bmatrix},$$

a target scenario vector obtained after splicing the two vectors may be $$A3 = \begin{bmatrix} 1 & 1 \\ 2 & 1 \\ 3 & 1 \end{bmatrix}.$$

The scenario vector may be generated by a scenario analysis module of various dimensions, for example, a sentiment analysis module or a semantic understanding-based semantic analysis module, and a scenario may also change with time, for example, the above semantic scenario and user mood scenario change with time. In addition, a dialog scenario built according to first dialog information may include a plurality of scenarios such as a service environment and a physical environment. Therefore, there may be a plurality of scenario vectors found through querying according to semantic tags, and the plurality of scenario vectors may reflect the dialog scenario of the first dialog information in a plurality of dimensions. The plurality of scenario vectors are spliced to obtain a target scenario vector, and a first dialog state is determined according to the target scenario vector. The first dialog state can be determined in a plurality of dimensions, to further improve accuracy of determining a dialog state.

Figure 5:
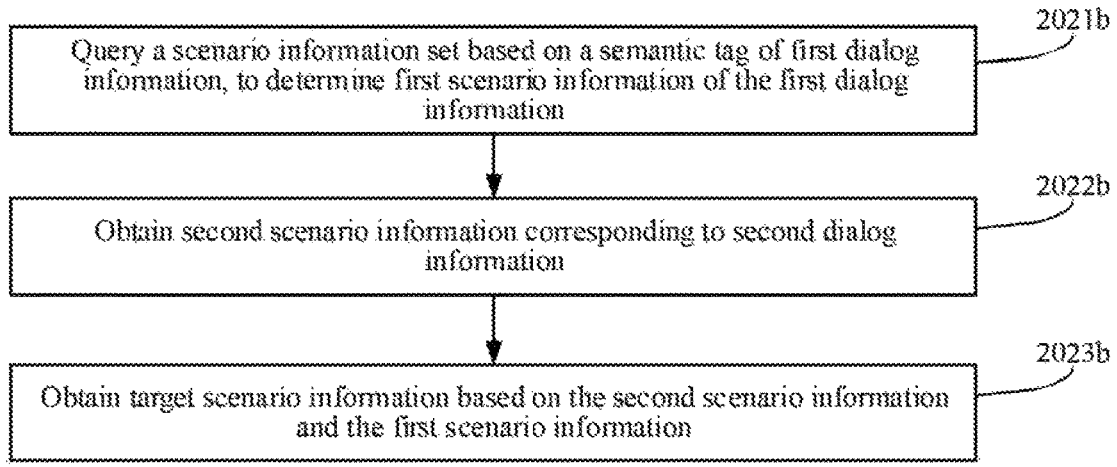
FIG. 5 is a flowchart of another method for determining target scenario information according to an exemplary embodiment of the present disclosure.

In a second possible implementation of determining target scenario information corresponding to the first dialog information, the target scenario information may be determined according to the first dialog information and second dialog information inputted before the first dialog information. For ease of description, in description of the second possible implementation, scenario information obtained according to the first dialog information is referred to as first scenario information, and scenario information obtained according to the second dialog information is referred to as second scenario information. As shown in FIG. 5, an implementation process may include the following steps.

In step 2021b, scenario information set is queried based on a semantic tag of first dialog information, to determine first scenario information of the first dialog information. For an implementation process of step 2021b, reference may be made to the implementation process of the first possible implementation of determining target scenario information corresponding to the first dialog information, and details are not described herein again.

In step 2022b, second scenario information corresponding to second dialog information is obtained. After second dialog information is inputted, target scenario information (that is, second scenario information) corresponding to the second dialog information is determined according to the second dialog information, and a subsequent step of determining a dialog state corresponding to the second dialog information is performed according to the second scenario information. Therefore, stored second scenario information may be directly queried for according to the second dialog information. Alternatively, scenario information set may be queried according to the obtained second dialog information to determine second scenario information.

In a step 2023b, target scenario information is obtained based on the second scenario information and the first scenario information. In an exemplary embodiment, an implementation of step 2023b may include adjusting the first scenario information based on the second scenario information, to obtain the target scenario information.

In a possible implementation, the first scenario information may be adjusted based on the second scenario information by using a neural network to obtain the target scenario information. In an exemplary embodiment, the neural network is, for example, an LSTM neural network in the following descriptions. For a structure of an LSTM neural network, refers to FIG. 6. X(t−1), X(t), and X(t+1) are inputs of the LSTM neural network at time points t−1, t, and t+1 respectively, that is, dialog information inputted at the time points t−1, t, and t+1, h(t−1), h(t), and h(t+1) are outputs of a hidden layer of the LSTM neural network at time points t−1, t, and t+1 respectively, that is, target scenario information at the time points t−1, t, and t+1. C(t−1), C(t), and C(t+1) are cell states transmitted from time points t−1, t, and t+1 to next time points respectively, and the cell state may be context information of dialog information. For example, assuming that dialog information X(t) inputted at a time point t is first dialog information, and dialog information X(t−1) inputted at a time point t−1 is second dialog information, h(t−1) outputted by the hidden layer at a time point t−1 is second scenario information, and h(t) outputted by the hidden layer at a time point t is target scenario information.

Figure 6:
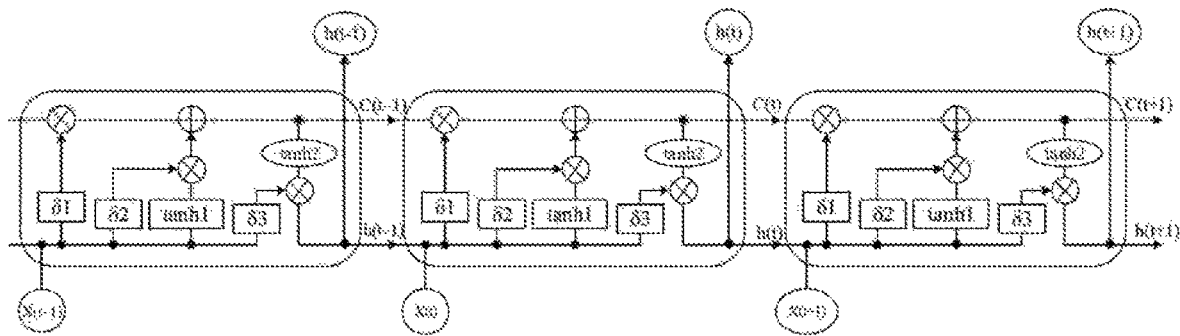
FIG. 6 is a schematic structural diagram of an LSTM neural network according to an exemplary embodiment of the present disclosure.

Still referring to FIG. 6, a function of the LSTM neural network can be implemented through three gates, that is, a forget gate, an input gate, and an output gate. The forget gate is used for determining to discard which information from the cell state, a threshold δ1 is used for controlling an amount of data passing through the forget gate, and a value range of δ1 is [0, 1]. δ1=0 means "reserving completely", and δ1=1 means "discarding completely" The input gate is used for determining which new information needs to be stored in the cell state, and a function of the input layer gate is mainly implemented through an input threshold layer (δ2) and a layer tan h1. The input threshold layer (δ2) is used for determining which values are updated, and the layer tan h1 is used for creating a new candidate vector and adding the new candidate vector into the cell state. The output gate is used for determining an output, and a function of the output gate is implemented through an output threshold layer (δ3) and a layer tan h2. The output threshold layer (δ3) determines which parts of the cell state need to be outputted, and the tan h2 is used for processing the cell state and outputting values within a range of [−1,1]. The output of the output gate is a product of an output of the output threshold layer (δ3) and an output of the layer tan h2. In an exemplary embodiment, values of δ1, δ2, and δ3 may be set according to actual requirements.

When a semantic understanding of first dialog information is inputted into an LSTM neural network, the LSTM neural network may obtain first scenario information corresponding to the first dialog information, and adjust the first scenario information according to second scenario information transmitted in the LSTM neural network, to obtain target scenario information.

When the target scenario information is obtained, the second scenario information can complement missing information in the first dialog information, so that the target scenario information can be determined according to relatively comprehensive information, and the determined target scenario information is more accurate. Further, a determined first dialog state has higher accuracy.

Figure 7:
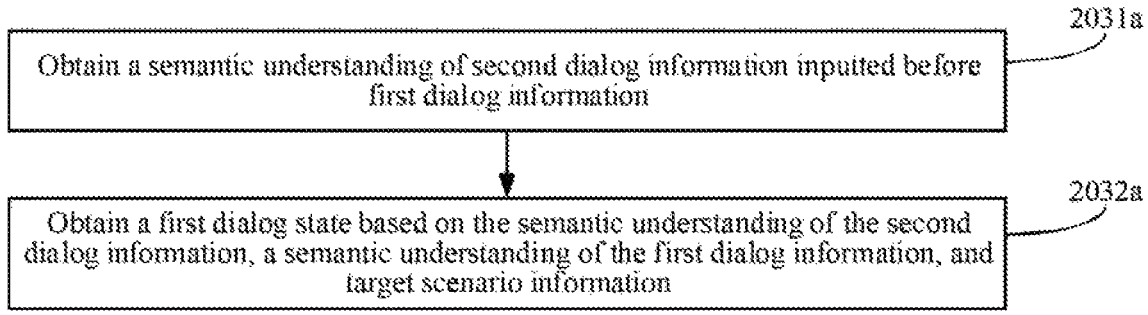
FIG. 7 is a flowchart of a method for obtaining, based on first dialog information and target scenario information, a first dialog state corresponding to the first dialog information according to an exemplary embodiment of the present disclosure.

In step 203, based on the first dialog information and the target scenario information, a first dialog state corresponding to the first dialog information is obtained. The first dialog state is used for representing a response mode for responding to the first dialog information. In an exemplary embodiment, referring to FIG. 7, an implementation process of step 203 may include the following steps.

In step 2031a, a semantic understanding of second dialog information inputted before first dialog information is obtained. After dialog information is inputted into a spoken dialog system each time, the spoken dialog system records each piece of the inputted dialog information. Therefore, in step 2031a, historical dialog information records of the spoken dialog system may be queried according to a time point at which first dialog information is inputted, to obtain dialog information inputted before the time point.

Before a first dialog state is determined, a semantic understanding of second dialog information is obtained, and the semantic understanding of the second dialog information can complement missing information in the first dialog information, so that the first dialog state can be determined according to relatively comprehensive information, and the determined dialog state is more accurate.

In step 2032a, a first dialog state based is obtained on the semantic understanding of the second dialog information, a semantic understanding of the first dialog information, and target scenario information. In an exemplary embodiment, step 2032a may be implemented through a neural network, and an implementation process thereof may include inputting a semantic understanding of first dialog information and target scenario information into a neural network, determining, by the neural network, a second dialog state according to a semantic understanding of second dialog information, and determining a first dialog state according to the second dialog state, the semantic understanding of the first dialog information, and the target scenario information. The neural network may be an LSTM neural network, and for the principle by which the LSTM neural network determines the first dialog state according to the second dialog state, the semantic understanding of the first dialog information, and the target scenario information, reference may be correspondingly made to the related description in step 2023b.

Because the same dialog information has different meanings in different scenarios, a robot determines different dialog states according to the different meanings, and correspondingly, makes different responses according to the different dialog states. However, in the related art, a robot cannot perceive a scenario. Therefore, when determining a dialog state of dialog information, the robot cannot effectively determine a meaning of the dialog information according to different scenarios. Consequently, accuracy of the dialog state determined according to the scenario is relatively low. In an exemplary embodiment, target scenario information corresponding to first dialog information can be determined according to the first dialog information, and the target scenario information can reflect a dialog scenario generating dialog information, so that when a dialog state of the first dialog information is determined, a dialog state corresponding to the dialog information in the dialog scenario can be determined. Further, interference from a plurality of different understandings of the same dialog information in different dialog scenarios to determining of the dialog state can be reduced. Therefore, according to the method for determining a dialog state provided in the exemplary embodiment, accuracy of determining the dialog state can be effectively improved. The robot can make a relatively accurate response according to a dialog state with relatively high accuracy, and further, a personalization ability of the robot can be improved.

Before target scenario information and a first dialog state are determined separately by using a neural network, the neural network may be trained separately by using preset samples, to obtain related parameters in the neural network. For example, before the target scenario information and the first dialog state are determined by using an LSTM neural network, parameters, such as a connection weight between neurons in the LSTM neural network, may be adjusted during training.

Figure 8:
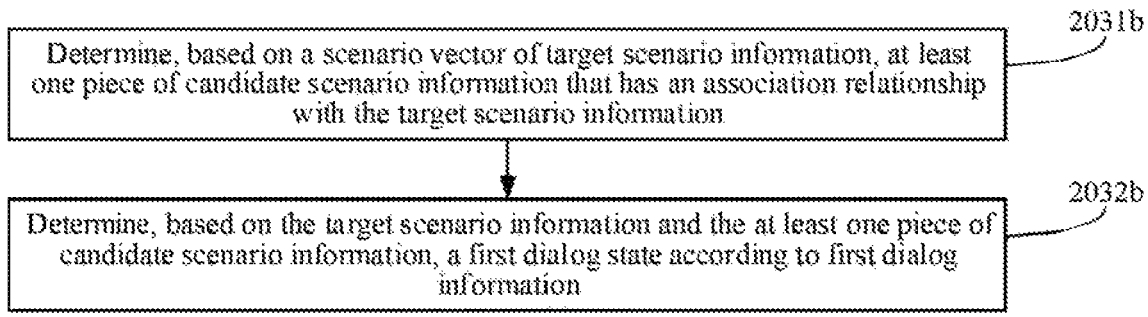
FIG. 8 is a flowchart of another method for obtaining, based on first dialog information and target scenario information, a first dialog state corresponding to the first dialog information according to an exemplary embodiment of the present disclosure.

Further, scenario information may be represented by a scenario vector, and each scenario vector is used for representing an association relationship between corresponding scenario information and other scenario information. Therefore, referring to FIG. 8, another implementation of step 203 may include the following steps.

In step 2031b, based on a scenario vector of target scenario information, at least one piece of candidate scenario information having an association relationship with the target scenario information is determined.

Each scenario vector is used for representing an association relationship between corresponding scenario information and other scenario information. Therefore, after target scenario information is determined, at least one piece of candidate scenario information having an association relationship with the target scenario information may be determined according to a scenario vector of the target scenario information.

For example, assuming that target scenario information is scenario information corresponding to a semantic tag "Joyful", a scenario vector corresponding to "Joyful" may be indicated through scenario information corresponding to "Happy", "Cheerful", and "Positive", that is, a scenario vector of the target scenario information may represent an association relationship between the scenario information corresponding to "Joyful" and the scenario information corresponding to "Happy", "Cheerful", and "Positive". Therefore, it may be determined, according to the scenario vector corresponding to "Joyful", that at least one piece of candidate scenario information is respectively scenario information corresponding to "Happy", scenario information corresponding to "Cheerful", and scenario information corresponding to "Positive".

In step 2032b, based on the target scenario information and the at least one piece of candidate scenario information, a first dialog state according to first dialog information is determined.

After target scenario information and at least one piece of candidate scenario information are determined, step 2032b may be performed on the target scenario information and each piece of scenario information in the at least one piece of candidate scenario information, to obtain corresponding dialog states, and then, the first dialog state is determined according to the dialog state corresponding to the target scenario information and the dialog state corresponding to each of the at least one piece of candidate scenario information. For example, an implementation of determining a first dialog state may include performing a preset logic operation on a dialog state corresponding to the target scenario information and a dialog state corresponding to the at least one piece of candidate scenario information, and determining a result of the logic operation as the first dialog state, or determining a weight of a dialog state corresponding to the target scenario information and a weight of a dialog state corresponding to each of the at least one piece of candidate scenario information, and determining a weighted sum of the dialog state corresponding to the target scenario information and the dialog state corresponding to the at least one piece of candidate scenario information as the first dialog state.

Due to factors such as a limited semantic understanding ability, when a semantic tag is determined according to a semantic understanding, accuracy of the determined semantic tag may be relatively low, and if target scenario information corresponding to dialog information is determined according to the semantic tag, an error may occur in the determined target scenario information, and consequently, accuracy of a determined dialog state is relatively low. However, when scenario information is represented by a scenario vector, the scenario information represented by the scenario vector has an association relationship with other scenario information indicating the scenario information. Therefore, even though accuracy of a semantic understanding is relatively low, when a semantic tag is determined according to the semantic understanding, the determined semantic tag is a semantic tag corresponding to the other scenario information, and the semantic tag can also be mapped into a semantic tag corresponding to the scenario information according to an association relationship between the scenario information and the other scenario information, to improve correctness of determining the semantic tag. Correspondingly, when target scenario information is determined according to the semantic tag with relatively high accuracy, accuracy of determining the target scenario information can be improved, that is, a generalization ability of scenario information is improved, thereby improving accuracy of determining a dialog state.

For example, a scenario vector corresponding to "Joyful" may be indicated by scenario information corresponding to semantic tags such as "Happy", "Cheerful", and "Positive". When inputted dialog information is information associated with a semantic tag "Joyful", a semantic tag determined according to the inputted dialog information is any one of "Happy", "Cheerful", and "Positive", the semantic tag can also be mapped into the semantic tag "Joyful" according to an association relationship between scenario information corresponding to the scenario vector corresponding to "Joyful" and scenario information corresponding to "Happy", "Cheerful", and "Positive", that is, correctness of determining the semantic tag is improved. When target scenario information corresponding to dialog information is determined according to the semantic tag, the target scenario information can be determined accurately.

In the related art, because there is a plurality of different understandings of the same dialog information in different dialog scenarios, during training of an LSTM neural network, more pieces of dialog information with different understandings are required, so that the LSTM neural network obtained through training can accurately determine a dialog state according to different dialog information. However, due to language diversity, a training sample cannot cover the plurality of different understandings of the dialog information in the different dialog scenarios, and consequently, an application scope of the LSTM neural network obtained through training is relatively narrow. When a scenario vector represents scenario information, because the scenario information has a relatively high generalization ability, and a dialog state can be determined accurately according to different dialog information, there is no need to use more training samples during training of the LSTM neural network, thereby reducing requirements on the training sample, and correspondingly expanding the application scope of the LSTM neural network.

Figure 9:
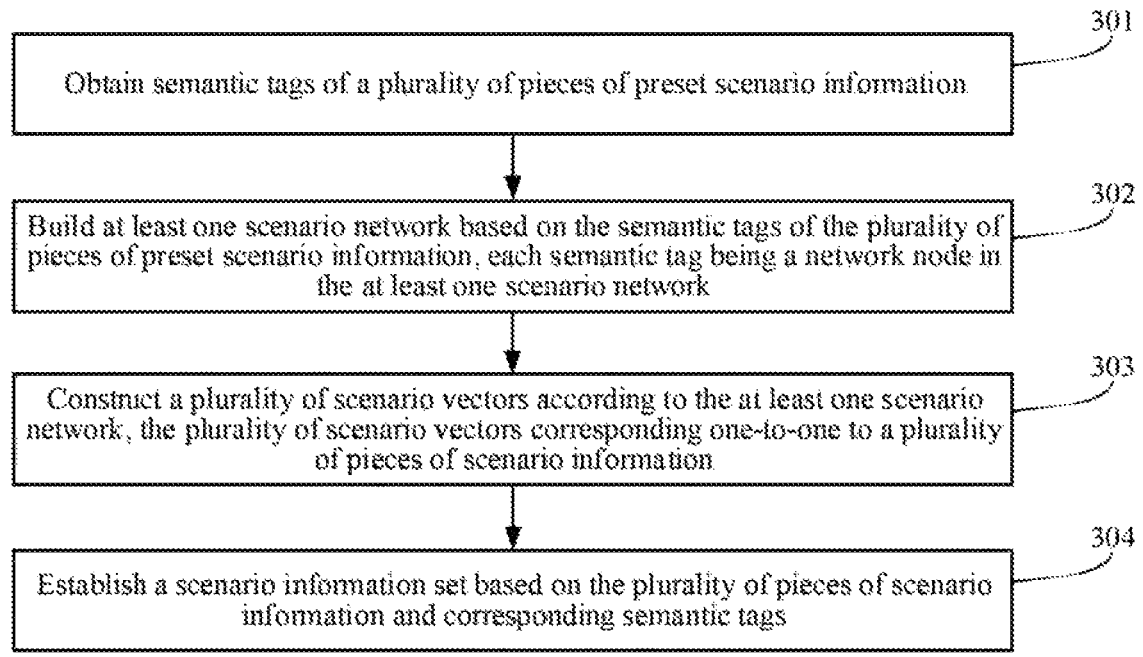
FIG. 9 is a flowchart of a method for building a scenario information set according to an exemplary embodiment of the present disclosure.

Before step 201 to step 203, the method for determining a dialog state may further include a process of establishing a scenario information set. Referring to FIG. 9, the process of establishing a scenario information set may include the following steps.

In step 301, semantic tags of a plurality of pieces of preset scenario information are obtained. The preset scenario information may be scenario information collected according to a preset training target, and a collection manner may include: a manual manner, an automatic manner, or a manual+automatic, semi-automatic manner. In an embodiment, the semantic tags of the plurality of pieces of preset scenario information may alternatively be obtained by using a classifier, a recommendation system, a preset rule set, or the like. For an implementation process of each implementation, reference may be correspondingly made to the implementation process in step 2022a, which is described above.

In a possible implementation, after semantic tags of scenario information are obtained, the semantic tags may be further categorized according to an association relationship between meanings of the semantic tags. For example, "Angry" is categorized into negative emotions, and "Joyful", "Happy", and "Cheerful" are categorized into positive emotions. After tag categorization is performed on the semantic tags, hierarchical management may be further performed on the semantic tags according to the association relationship. For example, hierarchical management may be performed on the semantic tags by using an ontology concept or by using a relatively loose tag architecture such as linked data or a data connection. The tags managed by using the ontology concept have strict directivity. When any tag in a tag architecture formed by the tags is moved or deleted, the entire tag architecture is affected. When the semantic tags are managed by using the relatively loose tag architecture, operations on any tag in the tag architecture do not affect other tags in the tag architecture.

For example, assuming that a plurality of pieces of preset scenario information include: scenario information 1, scenario information 2, scenario information 3, scenario information 4, scenario information 5, and scenario information 6, after the six pieces of scenario information are inputted into a classifier, semantic tags of the six pieces of scenario information outputted by the classifier are: "Positive", "Negative", "Joyful", "Angry", "Cheerful", and "Happy". For easy viewing, a correspondence between scenario information and a semantic tag is indicated through Table 1.

TABLE 1

| | Scenario information | | | | | |
|---|---|---|---|---|---|---|
| | Scenario information 1 | Scenario information 2 | Scenario information 3 | Scenario information 4 | Scenario information 5 | Scenario information 6 |
| Semantic tag | Positive | Negative | Joyful | Anger | Cheerful | Happy |

In step 302, at least one scenario network is built based on the semantic tags of the plurality of pieces of preset scenario information. Each semantic tag is a network node in the at least one scenario network.

Generally, there is an association relationship between semantic tags of different types of dialog scenarios. For example, there is an association relationship between semantic tags, such as "Positive", "Negative", "Joyful", "Angry", "Happy", and "Cheerful", classified from an emotion perspective. The association relationship between the semantic tags may be indicated in a form of a network. Therefore, at least one scenario network may be built based on semantic tags of a plurality of pieces of scenario information, and each semantic tag is a network node in the at least one scenario network. In an exemplary embodiment, semantic tags of a plurality of pieces of scenario information may be analyzed by using a data mining method, to find an association relationship between a plurality of semantic tags, and at least one scenario network is built based on the association relationship.

Figure 10:
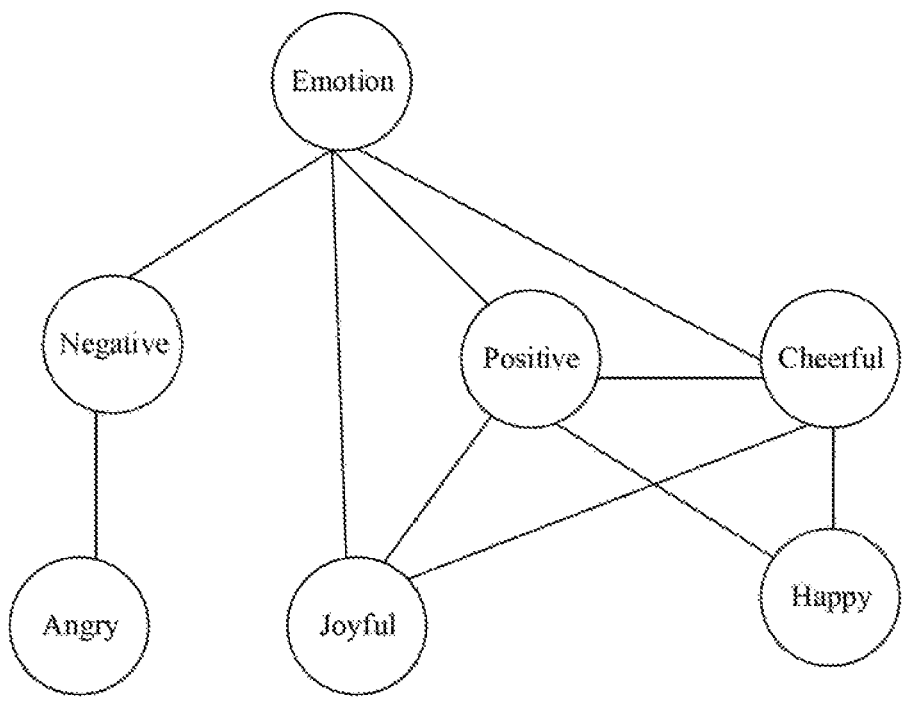
FIG. 10 is a schematic diagram of a built scenario network according to an exemplary embodiment of the present disclosure.

For example, for the semantic tags of the six pieces of scenario information obtained in step 301, a scenario network shown in FIG. 10 may be built according to an association relationship between the tags of the six pieces of scenario information. It may be seen from the scenario network shown in FIG. 10 that dialog scenarios indicated by the six pieces of scenario information may be classified from an emotion perspective, and there is an association relationship between a semantic tag "Negative" corresponding to the scenario information 2 and a semantic tag "Angry" corresponding to the scenario information 4. There is an association relationship between a semantic tag "Positive" corresponding to the scenario information 1 and a semantic tag "Joyful" corresponding to the scenario information 3, a semantic tag "Cheerful" corresponding to the scenario information 5, and a semantic tag "Happy" corresponding to the scenario information 6. There is an association relationship between the semantic tag "Joyful" corresponding to the scenario information 3 and the semantic tag "Cheerful" corresponding to the scenario information 5. There is an association relationship between the semantic tag "Cheerful" corresponding to the scenario information 5 and the semantic tag "Happy" corresponding to the scenario information 6.

Figure 11:
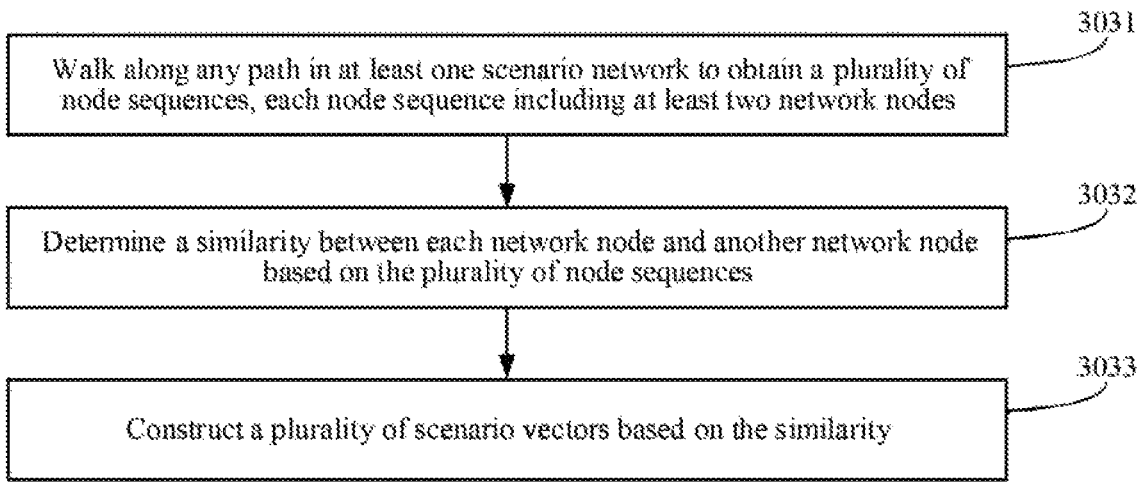
FIG. 11 is a flowchart of a method for constructing a plurality of scenario vectors according to a connection relationship between network nodes in at least one scenario network according to an exemplary embodiment of the present disclosure.

In step 303, a plurality of scenario vectors are constructed according to the at least one scenario network. The plurality of scenario vectors corresponds one-to-one to the plurality of pieces of scenario information. An exemplary implementation process of step 303 may include constructing the plurality of scenario vectors according to a connection relationship between network nodes in the at least one scenario network. Referring to FIG. 11, the implementation process of step 303 may include the following steps.

In step 3031, any path in at least one scenario network is walked to obtain a plurality of node sequences. Each node sequence includes at least two network nodes.

A random network node in a scenario network is used as a starting point of a walking path during walking in the scenario network, any network node in a neighborhood of the starting point in the scenario network is determined as a reached point during the walking from the starting point, the walking is continued by using the reached point as a starting point, and the walking is stopped when a quantity of steps reaches a preset quantity of steps or the walking path meets a preset requirement. During the walking, a path from a starting point of the walking to an end point of the walking includes a plurality of network nodes, and a sequence formed by the plurality of network nodes according to a walking order is referred to as a node sequence. In addition, when step 3031 is performed, a plurality of starting points may be selected from the scenario network for walking, to obtain a plurality of node sequences, and each node sequence includes at least two network nodes. In an exemplary embodiment, walking may be performed in a scenario network by using a random walk algorithm to obtain a plurality of node sequences.

Figure 12:
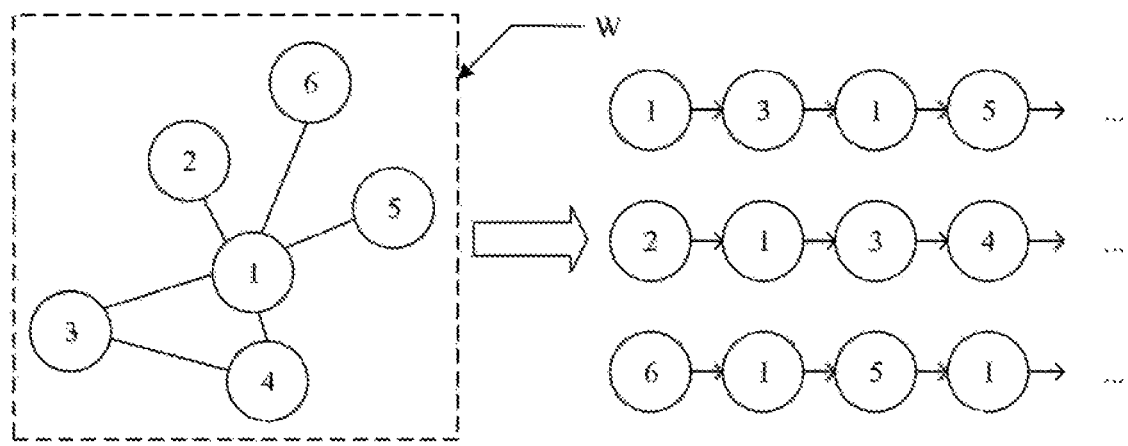
FIG. 12 is a schematic diagram of a scenario network according to an exemplary embodiment of the present disclosure.

For example, referring to FIG. 12, a scenario network W includes a network node 1, a network node 2, a network node 3, a network node 4, a network node 5, and a network node 6. After walking in the scenario network W, a plurality of node sequences may be obtained. For example, at least three node sequences may be obtained. These include the network node 1→the network node 3→the network node 1→the network node 5, the network node 2→the network node 1→the network node 3→the network node 4, and the network node 6→the network node 1→the network node 5→the network node 1. Where "→" represents a walking direction.

In step 3032, a similarity between each network node and another network node is determined based on the plurality of node sequences. The similarity between the network node and the other network node refers to a similarity between a semantic meaning expressed by a semantic tag corresponding to the network node and a semantic meaning expressed by a semantic tag corresponding to the other network node. A higher frequency of two network nodes both appearing in one node sequence indicates a higher similarity between the two network nodes. In addition, a shorter distance between the two network nodes appearing in the node sequence indicates a higher similarity between the two network nodes. According to the two principles, the similarity between each node and another network node may be determined based on a plurality of node sequences. In an exemplary embodiment, the plurality of node sequence may be inputted into a neural network, after analyzing each node, the neural network may output a similarity between each node and another node.

For example, assuming that network nodes in a node sequence include: "Joyful", "Happy", "Cheerful", and "Positive", after the node sequence is inputted into a neural network, similarities between outputted "Joyful" and "Happy" "Cheerful", and "Positive" are 0.45, 0.35, and 0.2 respectively, similarities between "Happy" and "Cheerful" and "Positive" are 0.4 and 0.15 respectively, and a similarity between "Cheerful" and "Positive" is 0.25. For easy viewing, the similarity between each network node and another network node is indicated through Table 2.

TABLE 2

|  | Joyful | Happy | Cheerful | Positive |
|---|---|---|---|---|
| Joyful | 1 | 0.45 | 0.35 | 0.2 |
| Happy | 0.45 | 1 | 0.4 | 0.15 |
| Cheerful | 0.35 | 0.4 | 1 | 0.25 |
| Positive | 0.2 | 0.15 | 0.25 | 1 |

In step 3033, a plurality of scenario vectors based on the similarity is constructed. A semantic tag is used for identifying a type of a dialog scenario indicated by scenario information. Correspondingly, a similarity between semantic tags may be indicated as a similarity between scenario information. In addition, a piece of scenario information may be indicated by using a combination of a plurality of pieces of other scenario information according to the similarity between the scenario information. The other scenario information is scenario information having a similarity to the piece of scenario information, and the combination of a plurality of pieces of scenario information used for indicating the piece of scenario information may be referred to as a scenario vector of the scenario information, that is, the scenario vector is used for representing an association relationship between the scenario information and the plurality of pieces of scenario information.

For example, referring to the similarities between network nodes shown in Table 2, it may be learned that a scenario vector corresponding to "Joyful" includes components of "Happy", "Cheerful", and "Positive", and a scenario vector K corresponding to "Joyful" may be indicated as K=0.45*Happy+0.35×Cheerful+0.2×Positive. An example of the scenario vector corresponding to "Joyful" is merely used for description, and an actual representation manner of the scenario vector is relatively complex.

In a possible implementation, step 303 may be performed through a network representation method such as deep walk, and an implementation process thereof may include performing random walk in at least one scenario network to generate a plurality of random walk node sequences, and training, by a neural network language model, each network node in the node sequences into a vector. A training process may be an unsupervised learning process, and the neural network language model may be a word vector model such as a skip-gram.

Step 302 and step 303 are a process of representing scenario information by using a scenario vector according to a semantic tag. In an exemplary embodiment, step 302 and step 303 may be skipped during establishment of the scenario information set, that is, a correspondence between scenario information and a semantic tag is directly established according to the semantic tag.

In step 304, a scenario information set is established based on a plurality of pieces of scenario information and corresponding semantic tags. In a possible implementation, if step 302 and step 303 are not performed, scenario information set may be directly established according to the semantic tags determined in step 301. In step 301, a semantic tag corresponding to each piece of scenario information is obtained. Therefore, one-to-one correspondences between the scenario information and the semantic tags may be directly established according to correspondences between the plurality of pieces of scenario information and the semantic tags, and the correspondences are stored into the scenario information set. The semantic tag may be index information of the scenario information, and when the scenario information set is queried, a semantic tag may be used as an index, and scenario information corresponding to the semantic tag may be queried for in the scenario information set for subsequent use.

In another possible implementation, if step 302 and step 303 are performed, the scenario information set may be established according to a correspondence between scenario information and a scenario vector and a correspondence between a semantic tag and scenario information, and the scenario information set records correspondences between the scenario information, the scenario vector, and the semantic tag. When scenario information set is queried, a semantic tag may be used as an index, and a scenario vector corresponding to the semantic tag is queried for in the scenario information set for subsequent use.

Step 301 to step 304 is a process of building the scenario information set according to preset scenario information and a semantic tag. When a first dialog state corresponding to first dialog information is obtained, there is no need to perform step 301 to step 304 each time, that is, when a first dialog state is obtained according to first dialog information and target scenario information, the established scenario information set may be directly queried, to determine the target scenario information corresponding to the first dialog information, and the first dialog state is determined according to the target scenario information.

Based on the foregoing, the embodiments of this application provide a method for determining a dialog state. Based on inputted dialog information, target scenario information corresponding to the dialog information is determined, the target scenario information can reflect a dialog scenario generating the dialog information, and a dialog state corresponding to the dialog information in the dialog scenario is determined based on the dialog information and the target scenario information. Compared with the related art, interference from a plurality of different understandings of the same dialog information in different dialog scenarios to determining of the dialog state can be reduced, thereby effectively improving accuracy of determining the dialog state. When a response is made to dialog information according to the relatively accurate dialog state, satisfaction of a user on the response can be improved, thereby improving user experience.

In addition, after first dialog information is obtained, no human intervention is needed in a process of determining a corresponding dialog state according to the first dialog information. Therefore, the method for determining a dialog state is greatly applicable to robots with higher degrees of freedom such as a chatbot.

Figure 13:
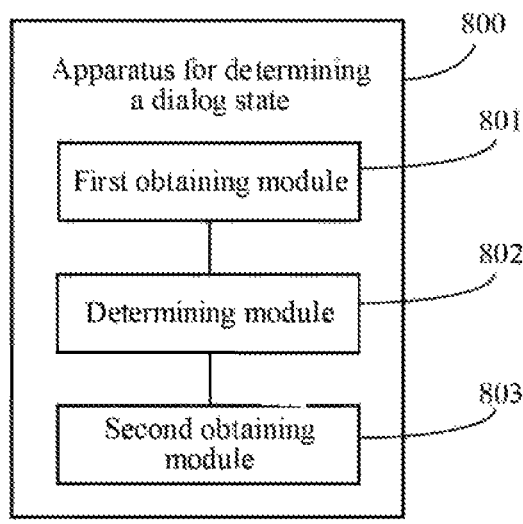
FIG. 13 is a schematic structural diagram of an apparatus for determining a dialog state according to an exemplary embodiment of the present disclosure.

FIG. 13 is a schematic structural diagram of an apparatus for determining a dialog state according to an embodiment of this application. As shown in FIG. 13. The apparatus 800 may include a first obtaining module 801 configured to obtain first dialog information. The first dialog information is dialog information inputted during a dialog process. The apparatus also includes a determining module 802 configured to determine, based on the first dialog information, target scenario information corresponding to the first dialog information, the target scenario information being used for indicating a dialog scenario of the first dialog information, and a second obtaining module 803 configured to obtain, based on the first dialog information and the target scenario information, a first dialog state corresponding to the first dialog information. The first dialog state being used for representing a response mode for responding to the first dialog information.

In an exemplary embodiment, scenario information may be represented by a scenario vector, each scenario vector is used for representing an association relationship between corresponding scenario information and another scenario information, and the second obtaining module 803 is configured to determine, based on a scenario vector of the target scenario information, at least one piece of candidate scenario information having an association relationship with the target scenario information, and determine, based on the target scenario information and the at least one piece of candidate scenario information, the first dialog state according to the first dialog information.

Figure 14:
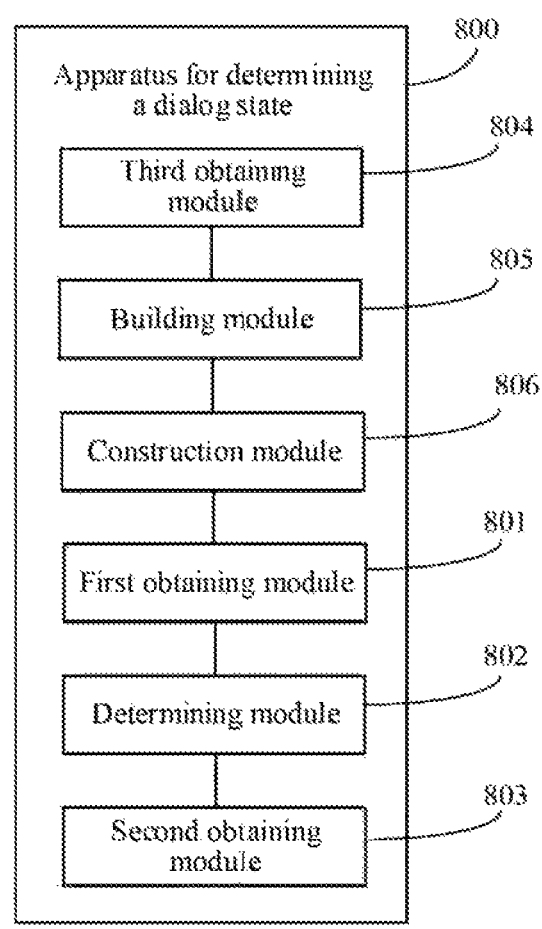
FIG. 14 is a schematic structural diagram of another apparatus for determining a dialog state according to an exemplary embodiment of the present disclosure.

In an exemplary embodiment, as shown in FIG. 14, the apparatus 800 may further include a third obtaining module 804 configured to obtain semantic tags of a plurality of pieces of scenario information. The semantic tag is used for identifying a type of a dialog scenario indicated by scenario information. The apparatus also includes a building module 805 configured to build at least one scenario network based on the semantic tags of the plurality of pieces of scenario information, each semantic tag being a network node in the at least one scenario network, and a construction module 806 configured to construct a plurality of scenario vectors according to the at least one scenario network. The plurality of scenario vectors corresponds one-to-one to the plurality of pieces of scenario information.

In an exemplary embodiment, the construction module 806 is configured to construct the plurality of scenario vectors according to a connection relationship between network nodes in the at least one scenario network.

In an exemplary embodiment, an implementation process of constructing, by the construction module 806, in the plurality of scenario vectors according to a connection relationship between network nodes in the at least one scenario network, any path in the at least one scenario network is walked to obtain a plurality of node sequences. Each node sequence includes at least two network nodes. A similarity between each network node and another network node is determined based on the plurality of node sequences, and the plurality of scenario vectors based on the similarity is constructed.

In an exemplary embodiment, the determining module 802 is specifically configured to obtain a semantic understanding of the first dialog information based on the first dialog information, recognize a semantic tag of the first dialog information based on the semantic understanding, and query a scenario information set based on the semantic tag, to determine the target scenario information. The scenario information set records a plurality of pieces of scenario information.

In an exemplary embodiment, the semantic tag of the first dialog information is a tag set including a plurality of semantic tags, the scenario information is represented by a scenario vector, and in querying, by the determining module 802, a scenario information set based on the semantic tag, to determine the target scenario information, the scenario information set is queried separately based on the plurality of semantic tags, to obtain at least one scenario vector corresponding to the plurality of semantic tags, and, in a case that there are a plurality of scenario vectors found through querying, the plurality of scenario vectors are spliced to obtain a target scenario vector.

In an exemplary embodiment, the determining module 802 is configured to query the scenario information set based on a semantic tag of the first dialog information to determine first scenario information of the first dialog information, obtain second scenario information corresponding to second dialog information inputted before the first dialog information, and obtain the target scenario information based on the second scenario information and the first scenario information.

In an exemplary embodiment, in obtaining, by the determining module 802, the target scenario information based on the second scenario information and the first scenario information the first scenario information is adjusted based on the second scenario information, to obtain the target scenario information.

In an exemplary embodiment, the second obtaining module 803 is configured to obtain a semantic understanding of second dialog information inputted before the first dialog information, and obtain a first dialog state based on the semantic understanding of the second dialog information, a semantic understanding of the first dialog information, and the target scenario information.

In an exemplary embodiment, in obtaining, by the second obtaining module 803, a first dialog state based on the semantic understanding of the second dialog information, a semantic understanding of the first dialog information, and the target scenario information, the semantic understanding of the first dialog information and the target scenario information into a neural network are inputted. The first dialog state is determined by a neural network according to a second dialog state, the semantic understanding of the first dialog information, and the target scenario information. The second dialog state is determined according to the semantic understanding of the second dialog information. In an exemplary embodiment, the neural network may be an LSTM neural network Based on the foregoing, the exemplary embodiments of this application provide an apparatus for determining a dialog state. The determining module determines, based on inputted dialog information, target scenario information corresponding to the dialog information, where the target scenario information can reflect a dialog scenario generating dialog information. The second obtaining module determines, based on the dialog information and the target scenario information, a dialog state corresponding to the dialog information in the dialog scenario. Compared with the related art, interference from a plurality of different understandings of the same dialog information in different dialog scenarios to determining of a dialog state can be reduced, thereby effectively improving accuracy of determining the dialog state. When a response is made to dialog information according to the relatively accurate dialog state, satisfaction of a user on the response can be improved, thereby improving user experience.

In addition, after first dialog information is obtained, no human intervention is needed in a process of determining a corresponding dialog state according to the first dialog state. Therefore, the apparatus for determining a dialog state is greatly applicable to robots with higher degrees of freedom such as a chatbot.

For the apparatus in the foregoing exemplary embodiments, a specific manner in which each module performs an operation is already described in detail in the embodiments related to the method, and details are not described herein again.

Figure 15:
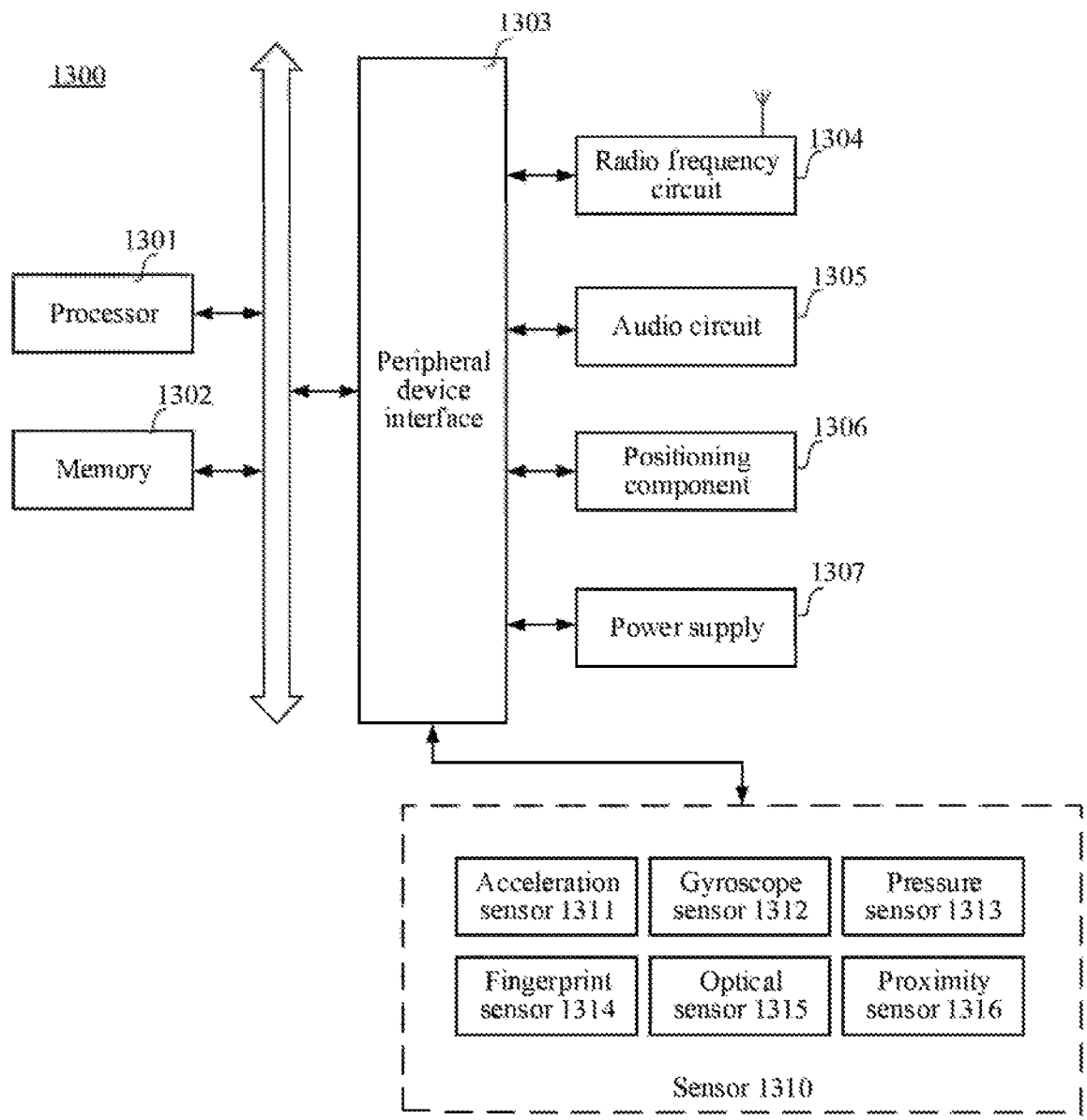
FIG. 15 is a schematic structural diagram of a terminal according to an exemplary embodiment of the present disclosure.

FIG. 15 shows a schematic structural diagram of a terminal 1300 according to an exemplary embodiment of this application. The terminal 1300 may be a portable mobile terminal, for example, a smart household, an intelligent in-vehicle, an intelligent robot, an intelligent speaker, an intelligent headset, a smartphone, a tablet computer, a moving picture experts group audio layer III (MP3) player, a moving picture experts group audio layer IV (MP4) player, a notebook computer, or a desktop computer. The terminal 1300 may also be referred to as another name such as user equipment, a portable terminal, a laptop terminal, or a desktop terminal. Generally, the terminal 1300 includes circuitry such as a processor 1301 and a memory 1302.

The processor 1301 may include one or more processing cores, and may be, for example, a 4-core processor or an 8-core processor. The processor 1301 may be implemented by at least one hardware form of a digital signal processor (DSP), a field-programmable gate array (FPGA), and a programmable logic array (PLA). The processor 1301 may alternatively include a main processor and a coprocessor. The main processor is configured to process data in an awake state, also referred to as a central processing unit (CPU), and the coprocessor is a low-power processor configured to process data in an idle state. In some embodiments, the processor 1301 may be integrated with a graphics processing unit (GPU). The GPU is responsible for rendering and drawing content to be displayed by a display screen. In some embodiments, the processor 1301 may further include an artificial intelligence (AI) processor. The AI processor is configured to process a calculation operation related to machine learning.

The memory 1302 may include one or more non-transitory computer-readable storage media. The memory 1302 may further include a high-speed random access memory, and a non-volatile memory such as one or more magnetic disk storage devices and a flash memory device. In some embodiments, the non-transient computer-readable storage medium in the memory 1302 is configured to store at least one instruction. The at least one instruction is executed by the processor 1301 to perform the method for determining a dialog state provided in the exemplary method embodiments in the present disclosure.

In exemplary embodiments, the terminal 1300 may further include a peripheral device interface 1303 and at least one peripheral device. The processor 1301, the memory 1302, and the peripheral device interface 1303 may be connected through a bus or a signal cable. Each peripheral device may be connected to the peripheral device interface 1303 through a bus, a signal cable, or a circuit board. Specifically, the peripheral device includes at least one of a radio frequency circuit 1304, an audio circuit 1305, a positioning component 1306, and a power supply 1307. In an exemplary embodiment, the peripheral device may further include a display screen, a camera component, or the like. In an exemplary embodiment, the terminal 1300 may alternatively be a device without a display screen and a camera component, for example, an intelligent speaker and an intelligent headset.

The peripheral device interface 1303 may be configured to connect at least one peripheral device related to input/output (I/O) to the processor 1301 and the memory 1302. In exemplary embodiments, the processor 1301, the memory 1302, and the peripheral device interface 1303 are integrated into the same chip or circuit board. In exemplary embodiments, any one or two of the processor 1301, the memory 1302, and the peripheral device interface 1303 may be implemented on an independent chip or circuit board. Other implementations are also possible without departing from the scope of the present disclosure.

The radio frequency circuit 1304 is configured to receive and transmit a radio frequency (RF) signal, also referred to as an electromagnetic signal. The radio frequency circuit 1304 communicates with a communications network and another communications device by using the electromagnetic signal. The radio frequency circuit 1304 may convert an electric signal into an electromagnetic signal for transmission, or convert a received electromagnetic signal into an electric signal. In an embodiment, the radio frequency circuit 1304 includes an antenna system, an RF transceiver, one or more amplifiers, a tuner, an oscillator, a digital signal processor, a codec chip set, a subscriber identity module card, and the like. The radio frequency circuit 1304 may communicate with another terminal by using at least one wireless communication protocol. The wireless communication protocol includes, but is not limited to, the World Wide Web, a metropolitan area network, an intranet, generations of mobile communications networks (2G, 3G, 4G, and 5G), a wireless local area network, and/or a Wi-Fi network. In exemplary embodiments, the radio frequency circuit 1304 may further include a near field communication (NFC) related circuit. The radio frequency circuit 1304 may also include circuitry for communication using other formats and protocols without departing from the scope of the present disclosure.

The audio circuit 1305 may include a microphone and a speaker. The speaker is configured to collect sound waves of a user and an environment, and convert the sound waves into electric signals and input the electrical signals into the processor 1301 for processing, or input the electrical signals into the radio frequency circuit 1304 to implement speech communication. For the purpose of stereo sound collection or noise reduction, there may be a plurality of microphones, respectively disposed at different parts of the terminal 1300. The microphone may be further a microphone array or an omnidirectional collection microphone. The speaker is configured to convert electric signals from the processor 1301 or the radio frequency circuit 1304 into sound waves. The speaker may be a conventional thin-film speaker or a piezoelectric ceramic speaker. When the speaker is the piezoelectric ceramic speaker, electric signals not only can be converted into sound waves that can be heard by human, but also can be converted into sound waves that cannot be heard by human for ranging and the like. In exemplary embodiments, the audio circuit 1305 may further include an earphone jack.

The positioning component 1306 includes circuitry configured to position a current geographic location of the terminal 1300, to implement a navigation or a location based service (LBS). The positioning component 1306 may be a positioning component based on the Global Positioning System (GPS) of the United States, the BeiDou system of China, or the Galileo system of the European Union.

The power supply 1307 includes circuitry configured to supply power to components in the terminal 1300. The power supply 1307 may be an alternating current, a direct current, a primary battery, or a rechargeable battery. When the power supply 1307 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

When the terminal 1300 includes a display screen, the display screen is configured to display a user interface (UI). The UI may include a graph, text, an icon, a video, and any combination thereof. When the display screen is a touch screen, the display screen is further capable of collecting a touch signal on or over a surface of the display screen. The touch signal may be inputted into the processor 1301 as a control signal for processing. In this case, the display screen may be further configured to provide a virtual button and/or a virtual keyboard, also referred to as a soft button and/or a soft keyboard. In exemplary embodiments, there is one display screen, disposed on a front panel of the terminal 1300. In exemplary embodiments, there may be two display screens, respectively disposed on different surfaces of the terminal 1300 or designed in a foldable shape. In exemplary embodiments, the display screen may be a flexible display screen, disposed on a curved surface or a folded surface of the terminal 1300. Even, the display screen may be further set to have a non-rectangular irregular graph, that is, a special-shaped screen. The display screen may be manufactured by using a material such as a liquid crystal display (LCD) or an organic light-emitting diode (OLED).

When the terminal 1300 includes a camera component, the camera component includes circuitry configured to collect an image or a video. In an exemplary embodiment, the camera component includes a front-facing camera and a rear-facing camera. Generally, the front-facing camera is disposed on the front panel of the terminal, and the rear-facing camera is disposed on a back face of the terminal. In exemplary embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In exemplary embodiments, the camera component may further include a flash. The flash may be a single color temperature flash or a double color temperature flash. The double color temperature flash refers to a combination of a warm flash and a cold flash, and may be configured to perform light my compensation at different color temperatures.

In exemplary embodiments, the terminal 1300 further includes one or more sensors 1310. The one or more sensors 1310 include, but are not limited to, an acceleration sensor 1311, a gyroscope sensor 1312, a pressure sensor 1313, a fingerprint sensor 1314, an optical sensor 1315, and a proximity sensor 1316.

The acceleration sensor 1311 may detect acceleration on three coordinate axes of a coordinate system established by the terminal 1300. For example, the acceleration sensor 1311 may be configured to detect components of gravity acceleration on the three coordinate axes. The processor 1301 may control, according to a gravity acceleration signal collected by the acceleration sensor 1311, the display screen to display the user interface in a frame view or a portrait view. The acceleration sensor 1311 may be further configured to collect motion data of a game or a user.

The gyroscope sensor 1312 may detect a body direction and a rotation angle of the terminal 1300. The gyroscope sensor 1312 may cooperate with the acceleration sensor 1311 to collect a 3D action by the user on the terminal 1300. The processor 1301 may implement the following functions according to the data collected by the gyroscope sensor 1312 motion sensing (such as changing the UI according to a tilt operation of the user), image stabilization at shooting, game control, and inertial navigation.

The pressure sensor 1313 may be disposed on a side frame of the terminal 1300 and/or a lower layer of the display screen. When the pressure sensor 1313 is disposed on the side frame of the terminal 1300, a holding signal of the user on the terminal 1300 may be detected. The processor 1301 performs left and right hand recognition or a quick operation according to the holding signal collected by the pressure sensor 1313. When the pressure sensor 1313 is disposed on the low layer of the display screen, the processor 1301 controls, according to a pressure operation of the user on the display screen, an operable control on the U. The operable control includes at least one of a button control, a scroll bar control, an icon control, and a menu control.

The fingerprint sensor 1314 is configured to collect a fingerprint of the user. The processor 1301 identifies an identity of the user according to the fingerprint collected by the fingerprint sensor 1314, or the fingerprint sensor 1314 identifies an identity of the user according to the collected fingerprint. When the identity of the user is identified as a trusted identity, the processor 1301 authorizes the user to perform a related sensitive operation. The sensitive operation includes unlocking a screen, viewing encrypted information, downloading software, payment, changing settings, and the like. The fingerprint sensor 1314 may be disposed on a front face, a back face, or a side face of the terminal 1300. When a physical button or a vendor logo is disposed on the terminal 1300, the fingerprint 1314 may be integrated with the physical button or the vendor logo.

The optical sensor 1315 is configured to collect ambient light intensity. In an embodiment, the processor 1301 may control display luminance of the display screen according to the ambient light intensity collected by the optical sensor 1315. Specifically, when the ambient light intensity is relatively high, the display luminance of the display screen is increased. When the ambient light intensity is relatively low, the display luminance of the display screen is reduced. In another embodiment, the processor 1301 may further dynamically adjust shooting parameters of the camera component according to the ambient light intensity collected by the optical sensor 1315.

The proximity sensor 1316, also referred to as a distance sensor, is generally disposed on the front panel of the terminal 1300. The proximity sensor 1316 is configured to collect a distance between a front face of the user and the front face of the terminal 1300. In an embodiment, when the proximity sensor 1316 detects that the distance between the front face of the user and the front face of the terminal 1300 is gradually decreased, the processor 1301 controls the display screen to switch from a screen-on state to a screen-off state. When the proximity sensor 1316 detects that the distance between the front face of the user and the front face of the terminal 1300 is gradually increased, the processor 1301 controls the display screen to switch from the screen-off state to the screen-on state.

Figure 16:
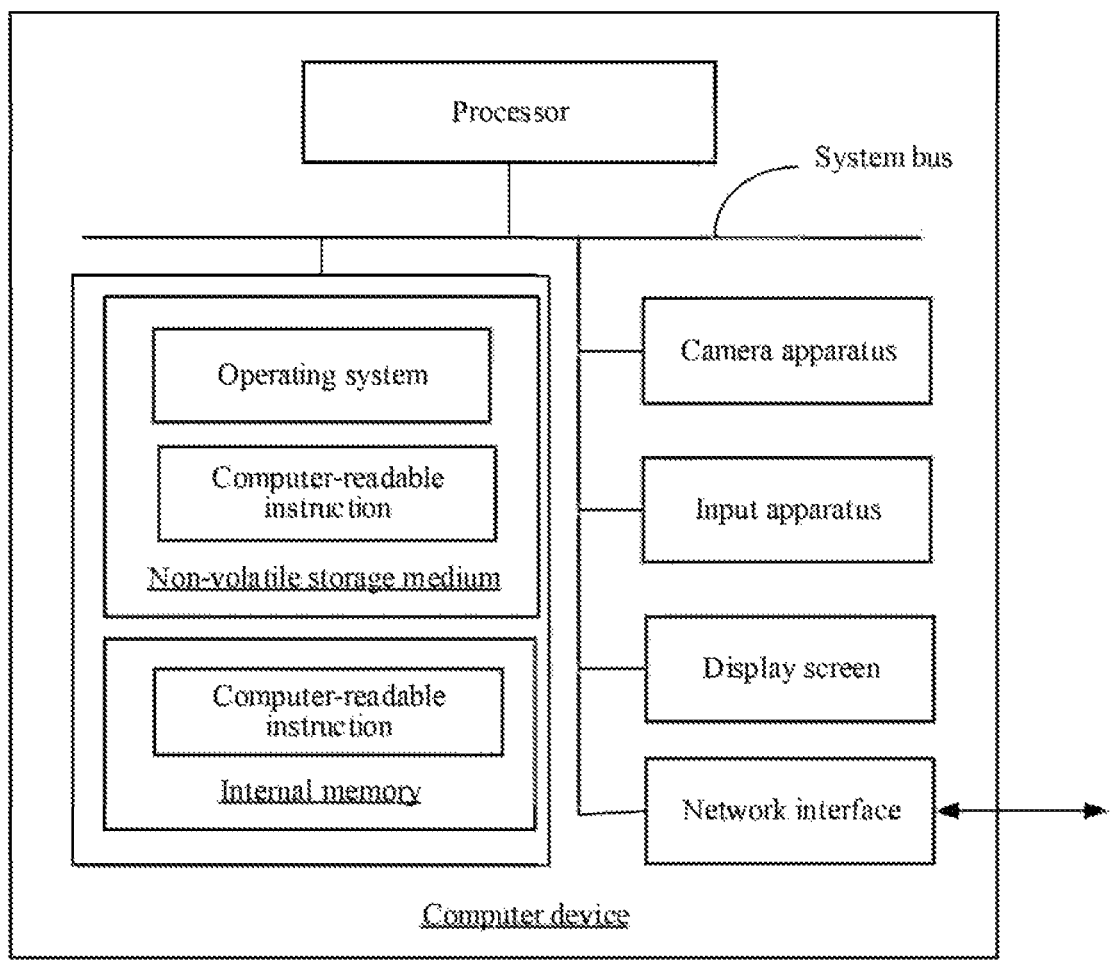
FIG. 16 is a structural block diagram of a computer device according to an exemplary embodiment of the present disclosure.

A person skilled in the art may understand that the structure shown in FIG. 15 does not constitute a limitation to the terminal 1300, and the terminal may include more components or fewer components than those shown in the figure, or some components may be combined, or a different component deployment may be used without departing from the scope of the present disclosure, FIG. 16 is a structural block diagram of a computer device according to an exemplary embodiment of this application, and the computer device may be specifically a terminal 110 or a server 120 in FIG. 1A. As shown in FIG. 16, the computer device includes circuitry such as a processor, a memory, a network interface, an input apparatus and a display screen that are connected by using a system bus. The memory includes a non-transitory, non-volatile storage medium and an internal memory. The non-transitory, non-volatile storage medium of the computer device stores an operating system, and may further store a computer-readable instruction. When executed by the processor, the computer-readable instruction may cause the processor to perform the method for determining a dialog state. The internal memory may also store a computer-readable instruction. When executed by the processor, the computer-readable instruction may cause the processor to perform the method for determining a dialog state. The display screen of the computer device may be a liquid crystal display screen or an electronic ink display screen. The input device of the computer device may be a touch layer covering the display screen, or may be a key, a trackball, or a touch pad disposed on a housing of the computer device, and may further be an external keyboard, a touch pad, a mouse, or the like. If the computer device is the server 120 in FIG. 1A, the computer device does not include the display screen.

A person skilled in the art may understand that, the structure shown in FIG. 16 is only a block diagram of a partial structure related to the solution in this application, and does not limit the computer device to which the solution of this application is applied. Specifically, the specific computer device may include more components or fewer components than those shown in the figure, or some components may be combined, or a different component deployment may be used without departing from the scope of the present disclosure.

In an exemplary embodiment, the apparatus for determining a dialog state provided in this application may be implemented in a form of a computer-readable instruction stored on a non-transitory computer-readable medium, and the computer-readable instruction may be run on the computer device shown in FIG. 16. The memory of the computer device may store program modules forming the apparatus for determining a dialog state, for example, the first obtaining module, the determining module, and the second obtaining module shown in FIG. 13. A computer-readable instruction formed by the program modules causes the processor to perform the steps in the method for determining a dialog state in the embodiments of this application described herein.

An exemplary embodiment provides a non-transitory computer-readable storage medium, the storage medium being a non-volatile storage medium and storing at least one instruction, at least one program, a code set, or an instruction set, and the at least one instruction, the at least one program, the code set, or the instruction set being loaded and executed by a processor to implement the method for determining a dialog state according to the foregoing embodiments of this application.

An exemplary embodiment provides a computer device, including a memory and a processor. The memory stores a computer-readable instruction, and the computer-readable instruction, when executed by the processor, causes the processor to perform the steps of the method for determining a dialog state. The steps of the method for determining a dialog state may be the steps in the method for determining a dialog state in the foregoing exemplary embodiments.

An exemplary embodiment provides a chip, including a programmable logical circuit and/or a program instruction. The chip, when run, can perform the method for determining a dialog state provided in the exemplary embodiments described herein.

In an exemplary embodiment of this application, the term "and/or" represents three logic relationships, and the wording "A and/or B" represents the following three logic relationships: only A exists, only B exists, and both A and B exist.

It is to be understood that the steps in the exemplary embodiments of this application are not necessarily performed in an order indicated by the step numbers. Unless explicitly specified, the sequence of the steps is not strictly limited, and the steps may be performed in other sequences. Moreover, at least some of the steps in each exemplary embodiment may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps.

A person of ordinary skill in the art will recognize that some or all procedures in the methods in the foregoing exemplary embodiments may be implemented by a computer-readable instruction instructing related hardware. The computer-readable instruction may be stored in a non-transitory, non-volatile computer-readable storage medium, and when the computer-readable instruction is executed, the procedures in the foregoing exemplary method embodiments may performed. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

As one of ordinary skill will recognize, the different features described in the foregoing exemplary embodiments may be randomly combined across the exemplary embodiments described herein without limitation. To make the description concise, not all possible combinations of the technical features in the foregoing embodiments are described. However, numerous variations are possible without departing from the scope of the present disclosure.

The foregoing exemplary embodiments only describe several implementations of this application, and are described in detail, but they are not to be construed as a limitation to the patent scope of this application. A person of ordinary skill in the art may further make variations and improvements without departing from the ideas of this application, which all fall within the protection scope of the present disclosure.

What is claimed is:

1. A method for determining a dialog state, the method comprising:
   obtaining, by circuitry of a computer device, first dialog information, the first dialog information being dialog information inputted during a dialog process;
   determining, by the circuitry of the computer device based on the first dialog information, target scenario information corresponding to the first dialog information, the target scenario information being used to indicate a dialog scenario of the first dialog information;
   determining, by the circuitry of the computer device based on a scenario vector of the target scenario information, at least one piece of candidate scenario information of a plurality of pieces of scenario information having an association relationship with the target scenario information; and
   obtaining, by the circuitry of the computer device based on the at least one piece of candidate scenario information and the target scenario information, a first dialog state according to the first dialog information, the first dialog state being used to represent a response mode for responding to the first dialog information, wherein
   the plurality of pieces scenario information is represented by a plurality of scenario vectors, each scenario vector representing an association relationship between the scenario information corresponding to the respective scenario vector and other scenario information of the plurality of pieces of scenario information,
   the plurality of scenario vectors is constructed according to at least one scenario network before the at least one piece of candidate scenario information is determined, the plurality of scenario vectors corresponding one-to-one to the plurality of pieces of scenario information, and
   the at least one scenario network is based on semantic tags of the plurality of pieces of scenario information, each semantic tag being a network node in the at least one scenario network and identifying a type of a dialog scenario indicated by the scenario information corresponding to the respective semantic tag.

2. The method according to claim 1, wherein before the determining the at least one piece of candidate scenario information, the method further comprises:
   obtaining, by the circuitry of the computer device, the semantic tags of the plurality of pieces of scenario information;
   building, by the circuitry of the computer device, the at least one scenario network based on the semantic tags of the plurality of pieces of scenario information; and
   constructing, by the circuitry of the computer device, the plurality of scenario vectors according to the at least one scenario network.

3. The method according to claim 2, wherein the constructing of the plurality of scenario vectors comprises:
   constructing, by the circuitry of the computer device, the plurality of scenario vectors according to a connection relationship between network nodes in the at least one scenario network.

4. The method according to claim 3, wherein the constructing of the plurality of scenario vectors comprises:
   walking, by the circuitry of the computer device along any path in the at least one scenario network to obtain a plurality of node sequences, each node sequence comprising at least two network nodes;
   determining, by the circuitry of the computer device, a similarity between each network node and another network node based on the plurality of node sequences; and
   constructing, by the circuitry of the computer device, the plurality of scenario vectors based on the similarity.

5. The method according to claim 1, wherein the determining of the target scenario information comprises:
   obtaining, by the circuitry of the computer device, a semantic understanding of the first dialog information based on the first dialog information;
   recognizing, by the circuitry of the computer device, a semantic tag of the first dialog information based on the semantic understanding; and
   querying, by the circuitry of the computer device, a scenario information set based on the semantic tag, to determine the target scenario information, the scenario information set including the plurality of pieces of scenario information.

6. The method according to claim 5, wherein the semantic tag of the first dialog information is a tag set comprising a plurality of semantic tags, and the querying of the scenario information set based on the semantic tag, to determine the target scenario information comprises:
   querying, by the circuitry of the computer device, the scenario information set separately based on the plurality of semantic tags, to obtain at least one of the plurality of scenario vectors corresponding to the plurality of semantic tags; and
   splicing, by the circuitry of the computer device when a plurality of the scenario vectors is found through querying, the plurality of found scenario vectors, to obtain the scenario vector of the target scenario information.

7. The method according to claim 1, wherein the determining the target scenario information comprises:
   querying a scenario information set based on a semantic tag of the first dialog information, and determining, by the circuitry of the computer device, first scenario information of the first dialog information;
   obtaining, by the circuitry of the computer device, second scenario information corresponding to second dialog information inputted before the first dialog information; and
   obtaining, by the circuitry of the computer device, the target scenario information based on the second scenario information and the first scenario information.

8. The method according to claim 7, wherein the obtaining of the target scenario information comprises:
   adjusting, by the circuitry of the computer device, the first scenario information based on the second scenario information, to obtain the target scenario information.

9. The method according to claim 1, wherein the obtaining of the first dialog state comprises:
   obtaining, by the circuitry of the computer device, a semantic understanding of second dialog information inputted before the first dialog information; and obtaining, by the circuitry of the computer device, the first dialog state based on the semantic understanding of the second dialog information, a semantic understanding of the first dialog information, and the target scenario information.

10. The method according to claim 9, wherein the obtaining of the first dialog state based on the semantic understanding of the second dialog information, the semantic understanding of the first dialog information, and the target scenario information comprises:

inputting, by the circuitry of the computer device, the semantic understanding of the first dialog information and the target scenario information into a neural network, and determining, by the neural network, the first dialog state according to a second dialog state, the semantic understanding of the first dialog information, and the target scenario information, the second dialog state being determined according to the semantic understanding of the second dialog information.

11. A computer device, comprising:

circuitry configured to:

obtain first dialog information, the first dialog information being dialog information inputted during a dialog process;

determine, based on the first dialog information, target scenario information corresponding to the first dialog information, the target scenario information being used to indicate a dialog scenario of the first dialog information;

determine, based on a scenario vector of the target scenario information, at least one piece of candidate scenario information of a plurality of pieces of scenario information having an association relationship with the target scenario information; and obtain, based on the at least one piece of candidate scenario information and the target scenario information, a first dialog state according to the first dialog information, the first dialog state being used to represent a response mode for responding to the first dialog information, wherein the plurality of pieces scenario information is represented by a plurality of scenario vectors, each scenario vector representing an association relationship between the scenario information corresponding to the respective scenario vector and other scenario information of the plurality of pieces of scenario information, the plurality of scenario vectors is constructed according to at least one scenario network before the at least one piece of candidate scenario information is determined, the plurality of scenario vectors corresponding one-to-one to the plurality of pieces of scenario information, and the at least one scenario network is based on semantic tags of the plurality of pieces of scenario information, each semantic tag being a network node in the at least one scenario network and identifying a type of a dialog scenario indicated by the scenario information corresponding to the respective semantic tag.

12. The computer device according to claim 11, wherein before the at least one piece of candidate scenario information is determined, the circuitry is configured to:

obtain the semantic tags of the plurality of pieces of scenario information;

build the at least one scenario network based on the semantic tags of the plurality of pieces of scenario information; and construct the plurality of scenario vectors according to the at least one scenario network.

13. The computer device according to claim 12, wherein in constructing the plurality of scenario vectors according to the at least one scenario network, the circuitry is configured to:

construct the plurality of scenario vectors according to a connection relationship between network nodes in the at least one scenario network.

14. The computer device according to claim 13, wherein in constructing the plurality of scenario vectors the circuitry is further configured to:

walk along any path in the at least one scenario network to obtain a plurality of node sequences, each node sequence comprising at least two network nodes;

determine a similarity between each network node and another network node based on the plurality of node sequences; and construct the plurality of scenario vectors based on the similarity.

15. The computer device according to claim 12, wherein in determining the target scenario information corresponding to the first dialog information, the circuitry is configured to:

query a scenario information set based on a semantic tag of the first dialog information, to determine first scenario information of the first dialog information;

obtain second scenario information corresponding to second dialog information inputted before the first dialog information; and obtain the target scenario information based on the second scenario information and the first scenario information.

16. The computer device according to claim 11, wherein in determining the target scenario information the circuitry is configured to:

obtain a semantic understanding of the first dialog information based on the first dialog information;

recognize a semantic tag of the first dialog information based on the semantic understanding; and query a scenario information set based on the semantic tag, to determine the target scenario information, the scenario information set including the plurality of pieces of scenario information.

17. The computer device according to claim 16, wherein the semantic tag of the first dialog information is a tag set comprising a plurality of semantic tags, and in querying the scenario information set based on the semantic tag, the circuitry is further configured to:

query the scenario information set separately based on the plurality of semantic tags, to obtain at least one of the plurality of scenario vectors corresponding to the plurality of semantic tags; and splice, when a plurality of the scenario vectors is found through querying, the plurality of found scenario vectors, to obtain the scenario vector of the target scenario information.

18. A non-transitory computer-readable medium storing computer-readable instructions that, when executed by processing circuitry, cause the processing circuitry to perform a method comprising:

obtaining first dialog information, the first dialog information being dialog information inputted during a dialog process;

determining, based on the first dialog information, target scenario information corresponding to the first dialog information, the target scenario information being used for indicating a dialog scenario of the first dialog information;

determining, based on a scenario vector of the target scenario information, at least one piece of candidate scenario information of a plurality of pieces of scenario information having an association relationship with the target scenario information; and obtaining, based on the at least one piece of candidate scenario information and the target scenario information, a first dialog state according to the first dialog information, the first dialog state being used for representing a response mode for responding to the first dialog information, wherein the plurality of pieces scenario information is represented by a plurality of scenario vectors, each scenario vector representing an association relationship between the scenario information corresponding to the respective scenario vector and other scenario information of the plurality of pieces of scenario information, the plurality of scenario vectors is constructed according to at least one scenario network before the at least one piece of candidate scenario information is determined, the plurality of scenario vectors corresponding one-to-one to the plurality of pieces of scenario information, and the at least one scenario network is based on semantic tags of the plurality of pieces of scenario information, each semantic tag being a network node in the at least one scenario network and identifying a type of a dialog scenario indicated by the scenario information corresponding to the respective semantic tag.

* * * * *